United States Patent
Miyauchi

(10) Patent No.: US 6,535,339 B1
(45) Date of Patent: *Mar. 18, 2003

(54) IMAGE PICKUP SYSTEM

(75) Inventor: Yuji Miyauchi, Machida (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/708,087

(22) Filed: Nov. 8, 2000

(30) Foreign Application Priority Data

Nov. 8, 1999 (JP) .......................................... 11-316827

(51) Int. Cl.⁷ .............................................. G02B 15/14
(52) U.S. Cl. ........................ 359/687; 359/684; 359/686
(58) Field of Search ................ 359/687, 686, 359/684

(56) References Cited

U.S. PATENT DOCUMENTS

| | | | |
|---|---|---|---|
| 5,138,492 A | 8/1992 | Hamano et al. | 359/684 |
| 5,189,558 A | 2/1993 | Ishii et al. | 359/687 |
| 5,418,646 A | 5/1995 | Shibata et al. | 359/687 |
| 5,671,062 A | 9/1997 | Nakamura | 359/687 |
| 6,016,228 A | 1/2000 | Uzawa | 359/687 |
| 6,331,917 B1 * | 12/2001 | Ishii et al. | 359/687 |

FOREIGN PATENT DOCUMENTS

| | | |
|---|---|---|
| JP | 3-200113 | 9/1991 |
| JP | 6-194572 | 7/1994 |
| JP | 10-062687 | 3/1998 |
| JP | 11-119100 | 4/1999 |
| JP | 11-258507 | 9/1999 |

* cited by examiner

*Primary Examiner*—Georgia Epps
*Assistant Examiner*—David N. Spector
(74) *Attorney, Agent, or Firm*—Pillsbury Winthrop LLP

(57) ABSTRACT

The invention provides a zoom lens system much more reduced in size and cost than ever before and best-suited for use on portable information terminals of small size. The zoom lens system comprises, in order from an object side thereof, a first lens group G1 having positive refracting power and designed to be fixed during zooming, a second lens group G2 having negative refracting power and designed to move from the object side to an image plane side of the system for zooming from a wide-angle end to a telephoto end of the system, a third lens group having refracting power and designed to move from the image plane side to the object side for zooming from the wide-angle end to the telephoto end, and a fourth lens group G4 having positive refracting power and designed to be movable during zooming. Condition (1) with respect to the power of the third lens group G3, condition (2) with respect to the amount of zooming movement of the third lens group G3 or condition (3) with respect to the composite power of the third and fourth lens groups G3 and G4 and condition (10) with respect to the actual value of the back focus are satisfied.

41 Claims, 12 Drawing Sheets

IMAGE PICKUP SYSTEM

This application claims benefit of Japanese Application(s) No. Hei 11-316827 filed in Japan on Nov. 8, 1999, the contents of which are incorporated by this reference.

BACKGROUND OF THE INVENTION

The present invention relates generally to a zoom lens system and an image pickup system using the same, and more particularly to a compact yet low-cost zoom lens system for cameras using an electronic image pickup means, for instance, camcorders, digital cameras, surveillance monitor cameras and cameras incorporated in portable telephones or PCs.

SUMMARY OF THE INVENTION

For zoom lens systems which belong to this field and are reduced in size and cost for consumer-oriented purposes, there has been proposed a four-group zoom lens system of +−++ construction in order from its object side, as shown in JP-A's 4-43311 and 4-78806. In this zoom lens system, the first and third lens groups are fixed during zooming, and the second lens group having negative power moves on an optical axis for zooming while the fourth lens group moves on the optical axis for correction of fluctuations of an image plane position with zooming. In zoom lens systems as set forth in JP-A's 6-94997 and 6-194572, on the other hand, the third lens group is moved from the image plane side to the object side for zooming from the wide-angle end to the telephoto end for the purpose of aiding in zoom action, thereby achieving further size reductions. These publications show zoom lenses having a relatively high zoom ratio of the order of 8 to 12. For a zoom lens system reduced exclusively in size and cost at the expense of zoom ratios, however, such prior art systems are still less than satisfactory because no sufficient size reductions are achievable thanks to an increased number of lenses.

In the zoom lenses shown in the aforesaid JP-A's 6-94997 and 6-194572, a substantial portion of their zooming action is assigned to the second lens group. To keep a substantially constant image point in this case, the transverse magnification of the second lens group must be in the neighborhood of −1 in the range from the wide-angle end to the telephoto end of the system. When further size reductions are intended by making the zoom ratio smaller than this, however, the amount of movement of the second lens group can be so reduced that the space margin between the first and second lens groups can be cut to the bone, thereby achieving efficient size reductions.

To perform zooming while the second lens group has a transverse magnification in the neighborhood of −1 with a narrower spacing between the first and second lens groups, however, it is required to increase the power of the first lens group with respect to the second lens group. This in turn causes an entrance pupil to be located at a farther position and so the height of off-axis rays passing through the first lens group to increase, resulting unavoidably in an increase in the size and, hence, the thickness of the first lens group. It is also required to increase the curvature of each lens in the first lens group. To ensure each lens of sufficient edge thickness, it is then necessary to increase the thickness of each lens in the first lens group.

SUMMARY OF THE INVENTION

In view of such states of the prior art as explained above, an object of the present invention is to provide a zoom lens system much more reduced in size and cost than ever before, and an image pickup system using the same.

One specific object of the present invention is to provide a four-group zoom lens system which can have the desired zoom ratio while its size is reduced without increasing the power ratio of the first lens group with respect to the second lens group.

Another specific object of the present invention is to achieve a compact zoom lens system suitable for use on digital cameras, and cameras added to portable telephones and PCs, which is designed in such a way as to provide a nearly telecentric exit beam with image pickup devices such as CCDs and CMOSs in mind. This zoom lens system ensures the desired back focus enough to receive a low-pass filter, a beam splitter, etc. if required, and achieves improved image-formation capability with a reduced number of lenses.

According to one aspect of the present invention, these objects are achievable by the provision of a zoom lens system characterized by comprising, in order from an object side of the zoom lens system, a first lens group having positive refracting power and designed to be fixed during zooming, a second lens group having negative refracting power and designed to move from the object side to an image plane side of the zoom lens system for zooming from a wide-angle end to a telephoto end of the zoom lens system, a third lens group having positive refracting power and designed to move from the image plane side to the object side for zooming from the wide-angle end to the telephoto end, and a fourth lens group having positive refracting power and designed to be movable for zooming, wherein the following conditions are satisfied:

$$0.5 < |F_2/F_3| < 1.2 \tag{1}$$

$$2.5 \text{ mm} < f_B(\min) < 4.8 \text{ mm} \tag{10}$$

where $F_i$ is the focal length of an i-th lens group and $f_{B(min)}$ is the length, as calculated on an air basis, of the final surface of a lens having power in said zoom lens system to an image plane of said zoom lens system, representing a figure at which said zoom lens system becomes shortest in a whole zooming space.

According to another aspect of the present invention, there is provided a zoom lens system characterized by comprising, in order from an object side of the zoom lens system, a first lens group having positive refracting power and designed to be fixed during zooming, a second lens group having negative refracting power and designed to move from the object side to an image plane side of the zoom lens system for zooming from a wide-angle end to a telephoto end of the zoom lens system, a third lens group having positive refracting power and designed to move from the image plane side to the object side for zooming from the wide-angle end to the telephoto end, and a fourth lens group having positive refracting power and designed to be movable for zooming, wherein the following conditions are satisfied:

$$0.49 < |L_3/L_2| < 1 \tag{2}$$

$$2.5 \text{ mm} < f_B(\min) < 4.8 \text{ mm} \tag{10}$$

where $L_i$ is the amount of movement of an i-th lens group from the wide-angle end to the telephoto end and $f_{B(min)}$ is the length, as calculated on an air basis, of the final surface of a lens having power in said zoom lens system to an image plane of said zoom lens system, representing a figure at which said zoom lens system becomes shortest in a whole zooming space.

According to yet another aspect of the present invention, there is provided a zoom lens system characterized by comprising, in order from an object side of the zoom lens system, a first lens group having positive refracting power and designed to be fixed during zooming, a second lens group having negative refracting power and designed to move from the object side to an image plane side of the zoom lens system for zooming from a wide-angle end to a telephoto end of the zoom lens system, a third lens group having positive refracting power and designed to move from the object side to the image plane side for zooming from the wide-angle end to the telephoto end, and a fourth lens group having positive refracting power and designed to be movable for zooming, wherein the following conditions are satisfied:

$$2 < (F_{3,4W})/IH < 3.3 \quad (3)$$

$$2.5 \text{ mm} < f_{B(min)} < 4.8 \text{ mm} \quad (10)$$

where $(F_{3,4W})$ is the composite focal length of the third and forth lens groups at the wide-angle end, IH is the radius of an image circle, and $f_{B(min)}$ is the length, as calculated on an air basis, of the final surface of a lens having power in said zoom lens system to an image plane of said zoom lens system, representing a figure at which said zoom lens system becomes shortest in a whole zooming space.

According to a further aspect of the present invention, there is provided a zoom lens system, characterized by comprising, in order from an object side of the zoom lens system, a first lens group having positive refracting power, a second lens group having negative refracting power and designed to move from the object side to an image plane side of the zoom lens system for zooming a wide-angle end to a telephoto end of the zoom lens system, a third lens group having positive refracting power and a fourth lens group having positive refracting power and designed to be movable for zooming, wherein said third lens group comprises, in order from an object side thereof, a positive lens component convex on an object side thereof and a cemented lens consisting of a positive lens element convex on an object side thereof and a negative lens element concave on an image plane side thereof, and both the object-side positive lens component and cemented lens in said third lens group are held in a lens barrel while the object-side convex surfaces thereof abut at their peripheries or their peripheral spots against said lens barrel, wherein the following condition is satisfied:

$$2.5 \text{ mm} < f_{B(min)} < 4.8 \text{ mm} \quad (10)$$

where $f_{B(min)}$ is the length, as calculated on an air basis, of the final surface of a lens having power in said zoom lens system to an image plane of said zoom lens system, representing a figure at which said zoom lens system becomes shortest in a whole zooming space.

Why the aforesaid lens arrangements are herein used and how they work are now explained.

In recent fields of camcorders and digital cameras as well as information systems using image pickup devices, e.g., portable telephones and personal computers, too, there are growing demands for consumer-oriented compact yet low-cost zoom lenses. Zoom lenses capable of meeting such demands, for instance, are disclosed in JP-A's 6-94997 and 6-194572 already referred to herein. As already explained, each zoom lens system has a zoom ratio of about 8 to 12, with a substantial portion of its zooming function allocated to the second lens group. To keep a substantially constant image point in this case, the transverse magnification of the second lens group must be in the neighborhood of −1 in the range from the wide-angle end to the telephoto end of the system.

When further size reductions are intended by making the zoom ratio smaller than this, however, the amount of movement of the second lens group can be so reduced that the space margin between the first and second lens groups can be cut to the bone, thereby achieving efficient size reductions.

To perform zooming while the second lens group has a transverse magnification in the neighborhood of −1 with a narrower spacing between the first and second lens groups, however, it is required to increase the power of the first lens group with respect to the second lens group. This in turn causes an entrance pupil to be located at a farther position and so the height of off-axis rays passing through the first lens group to increase, resulting unavoidably in an increase in the size and, hence, the thickness of the first lens group. It is also required to increase the curvature of each lens in the first lens group. To ensure each lens of sufficient edge thickness, it is then necessary to increase the thickness of each lens in the first lens group.

According to the present invention, these problems can be averted by increasing the proportion of the zooming action allocated to the third lens group, thereby ensuring the desired zoom ratio with no significant variation in the power ratio between the first lens group and the second lens group and, hence, achieving size reductions. To allow the third lens group to have such an increased zooming action, it is required to have relatively large power, as defined by condition (1). When the lower limit of 0.5 to condition (1) is not reached or when the power of the third lens group becomes weak with respect to the power of the second lens group, no size reductions are achievable because the amount of zooming movement of the third lens group becomes too large and, accordingly, the amount of movement of the second lens group to keep the image plane at a constant position becomes large. When the upper limit of 1.2 to condition (1) is exceeded or when the power of the third lens group becomes strong with respect to the power of the second lens group, the amount of astigmatism produced at the third lens group becomes too large, and no sufficient space can be obtained between the second and third lens groups because the distance between the third lens group and an object point with respect thereto becomes too short. To insert an image pickup package such as CCDs and CMOSs as well as an IR cut filter, a low-pass filter or the like in the optical system, it is then required that the back focus $f_B$ be 2.5 mm or greater. When the back focus $f_B$ exceeds 4.8 mm, on the other hand, no compactness can be achieved. For this reason, it is required that the following condition (10) be satisfied.

$$2.5 \text{ mm} < f_{B(min)} < 4.8 \text{ mm} \quad (10)$$

where $f_{B(min)}$ is the length, as calculated on an air basis, of the final surface of a lens having power in said zoom lens system to an image plane of said zoom lens system, representing a figure at which said zoom lens system becomes shortest in a whole zooming space. By the term "lens having power" is herein intended a lens whose refracting power is not zero.

When the lower limit of 2.5 mm to condition (1) is not reached, it is impossible to obtain any space for receiving filters such as an IR cut filter. When the upper limit of 4.5 mm is exceeded, on the other hand, the size of the zoom lens system increases. This condition is particularly important for reducing the size of an optical system used with an image pickup device for portable telephones or notebook PCs.

More preferably, the zoom lens system of the invention should satisfy the following condition (4):

$$0.6 < |F_2/F_3| < 1 \tag{4}$$

To allow the third lens group to have a relatively large zooming action as mentioned above, it is required to increase the amount of zooming movement of the third lens group, as defined by condition (2) giving a definition of the ratio of the amount of movement from the wide-angle end to the telephoto end between the second lens group and the third lens group. When the lower limit of 0.49 to condition (2) is not reached or when the amount of movement of the third lens group becomes small with respect to the second lens group, it is impossible to allocate any sufficient zooming action to the third lens group. When the upper limit of 1 is exceeded or when the amount of movement of the third lens group becomes large with respect to the second lens group, fluctuations of aberrations such as astigmatism and coma become too large during zooming with the third lens group, and no sufficient space can be obtained between the second lens group and the third lens group, because the distance at the telephoto end between the third lens group and the object point with respect thereto becomes too short.

To reduce the overall length of such a four-group zoom lens system of +−++construction as intended herein, it is effective to make strong the powers of the third and fourth lens groups for relaying a virtual image formed by the first and second lens group to the image pickup plane, thereby reducing the distance from the position of the virtual image formed by the first and second lens groups to the image pickup plane. It is thus preferable to make the composite power of the third and fourth lens groups strong, as defined by condition (3). When the upper limit of 3.3 to condition 3 is exceeded or when the composite focal length of the third and fourth lens groups at the wide-angle end becomes long with respect to the image circle radius (image height) IH (the power becomes weak), no sufficient size reductions are achievable for the foregoing reasons. When the lower limit of 2 to condition (3) is not reached or when the composite focal length of the third and fourth lens groups at the wide-angle end becomes short with respect to the image circle radius (the power becomes strong), astigmatisms produced at the third and fourth lens groups become too large, and no sufficient space can be obtained between the second and third lens groups at the telephoto end, because the distance between the third lens group and the object point with respect thereto becomes too short.

For such a zoom lens system as intended herein, it is preferable to carry out focusing with the fourth lens group wherein the angle of incidence of an axial light beam is relatively small, because aberration fluctuations with focusing can be limited. In addition, the fourth lens group, because of being relatively small in lens diameter and light in weight, has the merit of reducing the driving torque for focusing.

To reduce the overall length of the zoom lens system, the largest possible portion of the composite power of the third and fourth lens groups should preferably be allocated to the third lens group. In the present invention, the power of the third lens group is thus relatively larger than that of the fourth lens group, as defined by the following condition (5) giving a definition of the ratio of the focal length of the third lens group with respect to that of the fourth lens group.

$$0.3 < F_3/F_4 < 0.8 \tag{5}$$

Here $F_i$ is the focal length of an i-th lens group. By making the focal length ratio of the third lens group with respect to the fourth lens group lower than the upper limit of 0.8 to condition (5), it is possible to achieve more considerable size reductions than ever before. When the focal length ratio of the third lens group with respect to the fourth lens group is below the lower limit of 0.3 to condition 5, however, the power of the fourth lens group becomes too weak or the amount of focusing movement of the fourth lens group becomes too large, resulting in increased aberration fluctuations with focusing.

To reduce the size of the zoom lens system according to the present invention, the fourth lens group should preferably comprise one positive lens. This is because the power of the fourth lens group is relatively smaller than that of the third lens group, as mentioned above.

To reduce astigmatism fluctuations with zooming, at least one surface in the fourth lens group should preferably be defined by an aspherical surface.

Preferably, the zoom lens system of the present invention should satisfy the following condition (6):

$$0.4 < |\beta_{2T}| < 1 \tag{6}$$

Here $\beta_{2T}$ is the transverse magnification of the second lens group at the telephoto end of the zoom lens system.

Condition (6) gives a definition of the absolute value of the transverse magnification of the second lens group at the telephoto end of the zoom lens system. When the absolute value of the transverse magnification of the second lens group at the telephoto end is below the lower limit of 0.4, the zooming action of the second lens group becomes insufficient and the power of the first lens group becomes too weak to achieve lens size reductions. On the other hand, when the absolute value of the transverse magnification of the second lens group at the telephoto end exceeds the upper limit of 1, the zooming action of the third lens group becomes insufficient and the power of the first lens group becomes too strong, resulting in an increase in the lens diameter of the first lens group and failing to achieve size reductions.

To reduce the overall size of the zoom lens system, the third lens group should preferably have an increased power with no change in its image-formation magnification. Preferably in this case, the principal points of the third lens group should be positioned as close to the object side as possible, thereby preventing the interference of the second lens group with the third lens group at the telephoto end, which may otherwise be caused by a reduction in the distance between the third lens group and the object point with respect to the third lens group. Thus, the third lens group should comprise three lenses or a positive, a positive and a negative lens in order from the object side, with at least one aspherical surface provided for correction of spherical aberrations.

If at least one surface in the second lens group is defined by an aspherical surface, it is then possible to make much better correction for fluctuations of astigmatism and coma with zooming.

In the present invention, the relatively large zooming action is assigned to the third lens group as mentioned above, so that loads of correction of aberrations on the first and second lens groups can be relieved. For this reason, the first lens group can be comprised of one positive lens. To make correction for chromatic aberration of magnification produced at the first lens group, the lens located nearest to the object side in the second lens group should preferably be composed of a negative lens having relatively large dispersion, as defined by the following condition (7) giving a definition of the Abbe's number of the negative lens located nearest to the object side in the second lens group.

$$v_{21} < 40 \tag{7}$$

Here $v_{21}$ is the Abbe's number of the negative lens located nearest to the object side in the second lens group.

To make correction for the chromatic aberration of magnification produced at the first lens group or the positive lens, it is preferable that the Abbe's number of the negative lens located nearest to the object side in the second lens group does not exceed the upper limit of 40 to condition (7). If the following condition (8) is satisfied, it is then possible to make much better correction for the chromatic aberration of magnification.

$$v_{21} < 35 \tag{8}$$

When the third lens group is made up of three lenses or a positive, a positive and a negative lens in order from the object side as contemplated herein, two positive lenses should be each convex on an object side thereof and one negative lens should have a strong concave surface on an image plane side thereof. This is because the principal points of the third lens groups should be located as close to the object side as possible for the purpose of size reductions. Two such positive lenses having strong refracting power and convex surfaces on their object sides and such a negative lens having a concave surface on its image plane side, if they are fabricated with decentration errors with respect to their optical axes, have increased influences on deterioration of performance. For this reason, the positive lens on the image plane side and the negative lens should preferably be cemented together. When this cemented lens and the positive lens on the object side are held in a lens holder, it is preferable that they are received therein while the peripheral edges of the convex surfaces thereof abut at their peripheries or at their peripheral several spots against the lens holder.

According to a further embodiment of the present invention, there is provided a zoom lens system characterized by comprising, in order from an object side of said zoom lens system, a first lens group having positive refracting power and designed to be fixed during zooming, a second lens group having negative refracting power and designed to move from the object side to an image plane side of said zoom lens system for zooming from a wide-angle end to a telephoto end of said zoom lens system, a third lens group having positive refracting power and designed to move constantly from the image plane side to the object side for zooming from the wide-angle end to the telephoto end, and a fourth lens group having positive refracting power and designed to be movable during zooming, wherein said third lens group comprises a cemented lens consisting of a positive lens and a negative lens, said fourth lens group comprises one positive lens, and the following condition (10) is satisfied.

$$2.5 \text{ mm} < f_{B(min)} < 4.8 \text{ mm} \tag{10}$$

For zooming from the wide-angle end to the telephoto end according to this arrangement, the second lens group having negative refracting power is moved from the object side to the image plane side and the third lens group having positive refracting power is moved from the image plane side to the object side, so that the zooming load so far applied on the second lens group can be assigned to the second and third lens groups. This in turn makes it possible to obtain the desired zoom ratio and achieve size reductions without increasing the power ratio of the first lens group with respect to the second lens group. According to such an arrangement wherein the proportion of the zooming action allocated to the third lens group is increased, it is thus possible to obtain the desired zoom ratio and achieve size reductions without increasing the power ratio of the first lens group with the second lens group.

Reference is now made to what action and effect are obtained when the third lens group comprises a cemented lens consisting of a positive lens and a negative lens. When the third lens group is designed to be movable during zooming, the load of correction of aberration fluctuations with zooming on the third lens group increases with the need of making more satisfactory correction for chromatic aberrations. For this reason, the third lens group is required to comprise a positive lens component and a negative lens component. If, in this case, relative decentration occurs between the positive lens and the negative lens, there is then large deterioration of image-formation capability. In the aforesaid arrangement, the decentration between the positive lens and the negative lens can be easily reduced by using a cemented lens consisting of a positive lens and a negative lens in the third lens group. In other words, it is possible to increase the proportion of the zooming action assigned to the third lens group, make good correction for chromatic aberrations, and make image quality unlikely to deteriorate due to decentration.

According to the aforesaid arrangement wherein the load of zooming so far assigned to the second lens group is allocated to the second and third lens groups, the load of correction of aberrations on the fourth lens group can be successfully reduced, so that the fourth lens group can be constructed of one positive lens and, hence, the desired image-formation capability can be obtained with size reductions.

In the aforesaid arrangement, it is preferable that at least one surface of the positive lens forming the fourth lens group is defined by an aspherical surface.

When the fourth lens group is constructed of one positive lens together with one aspherical surface introduced therein, the load of zooming can be allocated to the second and third lens groups, and the fourth lens group—whose weight is reduced accordingly—makes it possible to achieve much better correction for aberrations, resulting in further cost and size reductions. It is noted that the aspherical surface used here may be formed by a so-called glass pressing process, a (so-called hybrid) process for applying a thin resin layer on a glass or other substrate, or a plastic molding process.

According to a further embodiment of the present invention, there is provided a zoom lens system characterized by comprising, in order from an object side of said zoom lens system, a first lens group having positive refracting power and designed to be fixed during zooming, a second lens group having negative refracting power and designed to move from the object side to an image plane side of said zoom lens system for zooming from a wide-angle end to a telephoto end of said zoom lens system, a third lens group having positive refracting power and designed to move constantly from the image plane side to the object side for zooming from the wide-angle end to the telephoto end, and a fourth lens group having positive refracting power and designed to be movable during zooming, wherein said second lens group, and said third lens group comprises a cemented lens consisting of a positive lens and a negative lens, and the following condition (10) is satisfied.

$$2.5 \text{ mm} < f_{B(min)} < 4.8 \text{ mm} \tag{10}$$

For zooming from the wide-angle end to the telephoto end according to this arrangement, the second lens group having negative refracting power is moved from the object side to the image plane side and the third lens group having positive refracting power is moved from the image plane side to the object side, so that the zooming load so far applied on the second lens group can be assigned to the second and third lens groups. This in turn makes it possible to obtain the desired zoom ratio and achieve size reductions without increasing the power ratio of the first lens group with respect to the second lens group. According to such an arrangement wherein the proportion of the zooming action allocated to the third lens group is increased, it is thus possible to obtain the desired zoom ratio and achieve size reductions without increasing the power ratio of the first lens group with the second lens group.

Reference is now made to what action and effect are obtained when the third lens group comprises a cemented lens consisting of a positive lens and a negative lens. When the third lens group is designed to be movable during zooming, the load of correction of aberration fluctuations with zooming on the third lens group increases with the need of making more satisfactory correction for chromatic aberrations. For this reason, the third lens group is required to comprise a positive lens component and a negative lens component. If, in this case, relative decentration occurs between the positive lens and the negative lens, there is then large deterioration of image-formation capability. In the aforesaid arrangement, the decentration between the positive lens and the negative lens can be easily reduced by using a cemented lens consisting of a positive lens and a negative lens in the third lens group. In other words, it is possible to increase the proportion of the zooming action assigned to the third lens group, make good correction for chromatic aberrations, and make deterioration of image quality due to decentration unlikely to occur.

Although the load applied on the second lens group is reduced, this lens group is a movable lens group during zooming. Still, a large load is imposed on the second lens group to make correction for aberration fluctuations with zooming; it is required to make satisfactory correction for chromatic aberrations. It is thus required that the second lens group comprise at least a positive lens component and a negative lens component. When, at this time, relative decentration occurs between the positive lens and the negative lens, the image-formation capability deteriorates excessively. According to the aforesaid arrangement wherein a cemented lens consisting of a positive lens and a negative lens is introduced in the second lens group, the decentration between the positive lens and the negative lens can be easily reduced. It is thus possible to make deterioration of image quality due to unlikely to occur.

According to a further embodiment of the present invention, there is provided a zoom lens system characterized by comprising, in order from an object side of said zoom lens system, a first lens group having positive refracting power and designed to be fixed during zooming, a second lens group having negative refracting power and designed to move from the object side to an image plane side of said zoom lens system for zooming from a wide-angle end to a telephoto end of said zoom lens system, a third lens group having positive refracting power and designed to move constantly from the image plane side to the object side for zooming from the wide-angle end to the telephoto end, and a fourth lens group having positive refracting power and designed to be movable during zooming, wherein said third lens group comprises, in order from an object side thereof, a positive lens and a cemented lens consisting of a positive lens and a negative lens, and the following condition (10) is satisfied.

$$2.5 \text{ mm} < f_{B(min)} < 4.8 \text{ mm} \tag{10}$$

For zooming from the wide-angle end to the telephoto end according to this arrangement, the second lens group having negative refracting power is moved from the object side to the image plane side and the third lens group having positive refracting power is moved from the image plane side to the object side, so that the zooming load so far applied on the second lens group can be assigned to the second and third lens groups. This in turn makes it possible to obtain the desired zoom ratio and achieve size reductions without increasing the power ratio of the first lens group with respect to the second lens group. According to such an arrangement wherein the proportion of the zooming action allocated to the third lens group is increased, it is thus possible to obtain the desired zoom ratio and achieve size reductions without increasing the power ratio of the first lens group with the second lens group.

The third lens group is constructed of three lenses or a positive, a positive and a negative lens in order from an object side thereof, so that the principal points of the third lens group can be generally located to the object side, thereby achieving further size reductions. Here, the negative lens is needed for correction of chromatic aberrations, and two positive lenses are needed to obtain strong positive power and reduce the size of the third lens group itself (simplify the construction of the third lens group itself). The ++– construction of the third lens group in order from the object side also allows various aberrations to be well corrected with a reduced number of lenses and the principal points of the third lens group to be generally located on the object side, so that the principal point positions of the second and third lens groups can efficiently be brought close to each other at the telephoto end, thereby achieving further size reductions of the zoom lens system.

According to a further embodiment of the present invention, there is provided a zoom lens system characterized by comprising, in order from an object side of said zoom lens, a first lens group having positive refracting power, a second lens group having negative refracting power, a third lens group having positive refracting power and a fourth lens group having positive refracting power, wherein a spacing between said first lens group and said second lens group, a spacing between said second lens group and said third lens group, and a spacing between said third lens group and said fourth lens group varies upon zooming, said third lens group comprises, in order from an object side thereof, a double-convex positive lens and a cemented lens consisting of a positive meniscus lens convex on an object side thereof and a negative meniscus lens, said fourth lens group comprises a double-convex lens in which an object-side surface thereof has a larger curvature, and the following condition (10) is satisfied.

$$2.5 \text{ mm} < f_{B(min)} < 4.8 \text{ mm} \tag{10}$$

According to this arrangement wherein the third lens group comprises, in order from an object side thereof, a positive lens convex on an object side thereof and a cemented lens consisting of a positive meniscus lens convex on an object side thereof and a negative meniscus lens, the principal points of the third lens group can generally be located on the object side, so that the size of the zoom lens system can be reduced. The cemented lens consisting of a positive meniscus lens and a negative meniscus lens is effective to reduce deterioration of performance due to decentration. The third lens group of such construction enables the fourth lens group to be made up one single lens.

By using as the single lens a double-convex lens wherein an object-side surface thereof has a larger curvature, it is further possible to make light rays incident on an image plane nearly telecentric and obtain the desired back focus while the number of lenses in the fourth lens group is minimized. It is thus possible to accomplish the aforesaid another object of the present invention.

According to a further embodiment of the present invention, there is provided a zoom lens system characterized by comprising, in order from an object side of said zoom lens, a first lens group having positive refracting power, a second lens group having negative refracting power, a third lens group having positive refracting power and a fourth lens group having positive refracting power, wherein a spacing between said first lens group and said second lens group, a spacing between said second lens group and said third lens group, and a spacing between said third lens group and said fourth lens group varies upon zooming, said third lens group comprises three lenses or a single lens and a cemented lens consisting of a positive lens and a negative lens in order from an object side thereof, said fourth lens group comprises one positive lens, and the following condition (10) is satisfied.

$$2.5 \text{ mm} < f_{B(min)} < 4.8 \text{ mm} \tag{10}$$

According to this arrangement, it is possible to achieve a zoom lens system of +−++ construction, which ensures satisfactory image-formation capability with a reduced number of lenses and is suitable for use on digital cameras. Here, the load of correction of aberrations is assigned exclusively to the second and third lens groups, and so the first and fourth lens groups taking less part in correction of aberrations can be each composed of one positive lens. According to the construction of the second lens group taking a substantial part in correction of aberrations wherein a single lens and a cemented lens consisting of a negative lens and a positive lens are provided in order from the object side, it is possible to reduce with a minimum number of lenses various aberrations inclusive of chromatic aberration produced at the third lens group alone, thereby making an additional contribution to size reductions. The cemented lens consisting of a negative lens and a positive lens, introduced in the third lens group, makes it possible to reduce deterioration of performance due to decentration.

Preferably, the power of the first lens group should be decreased, because the amount of aberrations produced at the first lens group can be reduced so that the load of correction of aberrations produced at the first lens group on the second and third lens groups can be reduced. Preferably, the zoom lens system according to this embodiment should satisfy the following condition (9):

$$8 < F_1/IH < 20 \tag{9}$$

Here $F_1$ is the focal length of the first lens group, and IH represents an image height (the length from the center of an image to the periphery of the image or the radius of an image circle). Falling below the lower limit of 8 to condition (9) is not preferable because the amount of aberrations produced at the first lens group becomes large. When the upper limit of 20 is exceeded, the power of the first lens group becomes too weak to obtain the desired sufficient zoom ratio or achieve size reductions.

According to a further embodiment of the present invention, there is provided a zoom lens system characterized by comprising, in order from an object side of said zoom lens, a first lens group having positive refracting power, a second lens group having negative refracting power, a third lens group having positive refracting power and a fourth lens group having positive refracting power, wherein a spacing between said first lens group and said second lens group, a spacing between said second lens group and said third lens group, and a spacing between said third lens group and said fourth lens group varies upon zooming, said first lens group comprises two lenses or a positive lens and a negative lens, said second or third lens group includes therein a cemented lens consisting of at least one set of a positive lens and a negative lens, and the following condition (10) is satisfied.

$$2.5 \text{ mm} < f_{B(min)} < 4.8 \text{ mm} \tag{10}$$

According to this arrangement wherein the first lens group comprises two lenses or a positive lens and a negative lens, chromatic aberration produced at the first lens group can be reduced irrespective of the power of the first lens group, so that the load of correction of chromatic aberrations on the second, third, and fourth lens groups can be relieved to reduce the overall size of the zoom lens system. By introducing the cemented lens consisting of a positive lens and a negative lens in the second or third lens group, it is then possible to reduce chromatic aberrations produced at lens groups other than the first lens group and prevent deterioration of image-formation capability due to decentration, etc. It is thus possible to achieve an optical system that is favorable in view of the number of lenses, fabrication cost, and size.

Preferably, the zoom lens systems according to the aforesaid embodiments of the present invention should satisfy the following condition (11).

$$2.5 \text{ mm} < f_{B(max)} < 4.8 \text{ mm} \tag{11}$$

Here $f_{B(max)}$ is the length, as calculated on an air basis, of the final surface of a lens having power in said zoom lens system to an image plane of said zoom lens system, representing a figure at which said zoom lens system becomes longest in a whole zooming space.

When the lower limit of 2.5 mm to condition (11) is not reached, it is impossible to obtain any space for receiving image pickup device packages or filters such as IR cut filters and low-pass filters, as in the case of condition (10). Accordingly, when these packages or filters are incorporated in the optical system, interference or other problems are likely to arise. When the upper limit of 4.8 mm is exceeded, on the other hand, no size reductions are achievable. This condition is important to conform zoom lens system size to the size of portable information terminals such as portable telephones and notebook PCs, in which the zoom lens system is incorporated.

For further size reductions, it is more preferable that $$2.5 \text{ mm} < f_{B(min)} < 4.0 \text{ mm}$$

For further size reductions, it is more preferable that $$2.5 \text{ mm} < f_{B(max)} < 4.0 \text{ mm}$$

Still other objects and advantages of the present invention will in part be obvious and will in part be apparent from the specification.

The present invention accordingly comprises the features of construction, combinations of elements, and arrangement of parts which will be exemplified in the construction hereinafter set forth, and the scope of the present invention will be indicated in the claims.

DESCRIPTION OF THE PREFERRED EMBODIMENTS

Examples 1 to 10 of the zoom lens system according to the present invention are now explained.

FIGS. 1 through 10 are sectional views, as viewed at the wide-angle ends, of Examples 1 to 10 of the zoom lens system according to the present invention. Numerical data on each example will be set out later. Throughout the embodiments shown in FIGS. 1 to 10, plane-parallel plates are located between the fourth lens groups G4 and image planes. These, for instance, include an image pickup device cover glass, and filters such as an IR cut filter and a low-pass filter. These plane-parallel plates are omitted from the numerical data given later.

Figure 1:
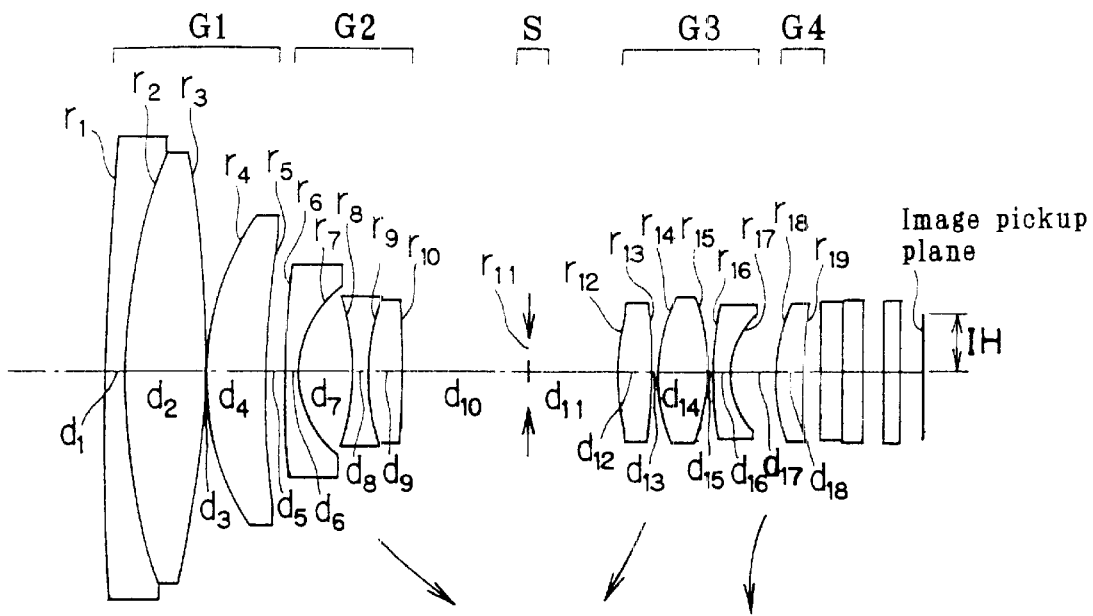
FIG. 1 is a sectional schematic illustrative of Example 1 of the zoom lens system according to the present invention, as viewed at the wide-angle end.

Example 1 is directed to a zoom lens system having a focal length of 3.643 to 10.420 mm and a field angle of 66.42° to 24°. As shown in FIG. 1, the first lens group G1 is made up of a cemented lens consisting of a negative meniscus lens convex on an object side thereof and a double-convex lens and a positive meniscus lens convex on an object side thereof. The second lens group G2 is made up of a negative meniscus lens convex on an object side thereof and a cemented lens consisting of a double-concave lens and a double-convex lens. In the rear of the second lens group G2 there is located a stop S. The third lens group G3 is made up of two double-convex lenses and a negative meniscus lens convex on an object side thereof, and the fourth lens group G4 is made up of one positive meniscus lens convex on an object side thereof. One aspherical surface is used for the surface located nearest to the object side in the third lens group G3. For zooming from the wide-angle end to the telephoto end, the first lens group G1 and the stop S remain fixed, the second lens group G2 moves from the object side to the image plane side, and the third and fourth lens groups G3 and G4 move from the image plane side to the object side while the space therebetween becomes wide, as indicated by arrows.

Figure 2:
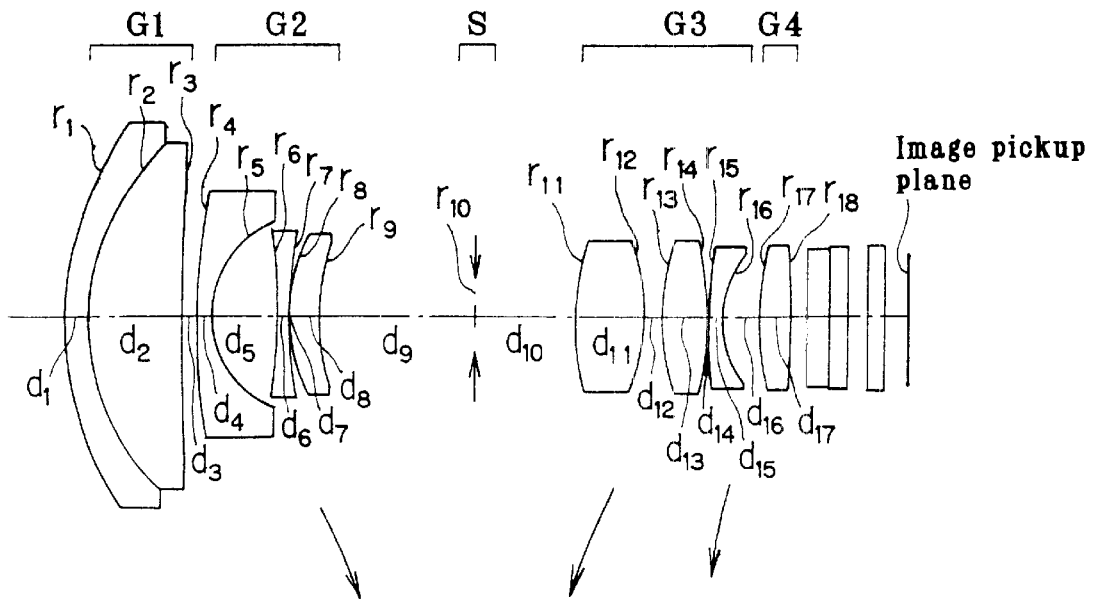
FIG. 2 is a sectional schematic illustrative of Example 2 of the zoom lens system according to the present invention, as viewed at the wide-angle end.

Example 2 is directed to a zoom lens system having a focal length of 2.924 to 8.425 mm and a field angle of 67.04° to 23.72°. As shown in FIG. 2, the first lens group G1 is made up of a cemented lens consisting of a negative meniscus lens convex on an object side thereof and a positive meniscus lens, and the second lens group G2 is made up of a negative meniscus lens convex on an object side thereof, a double-concave lens and a positive meniscus lens convex on an object side thereof. In the rear of the second lens group G1 there is located a stop S. The third lens group G3 is made up of two double-convex lenses and a negative meniscus lens convex on an object side thereof, and the fourth lens group G4 is made up of one double-convex lens. One aspherical surface is used for the surface located nearest to the object side in the third lens group G3. For zooming from the wide-angle end to the telephoto end, the first lens group G1 and the stop S remain fixed, the second lens group G2 moves from the object side to the image plane side, and the third and fourth lens groups G3 and G4 move from the image plane side to the object side while the space therebetween becomes wide, as indicated by arrows.

Figure 3:
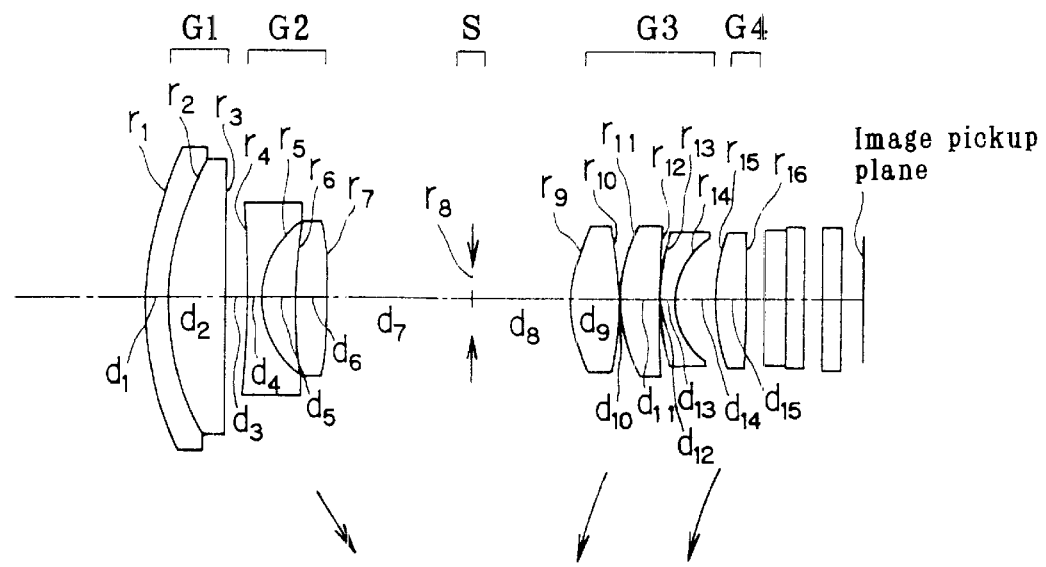
FIG. 3 is a sectional schematic illustrative of Example 3 of the zoom lens system according to the present invention, as viewed at the wide-angle end.

Example 3 is directed to a zoom lens system having a focal length of 3.238 to 9.300 mm and a field angle of 66.82° to 23.88°. As shown in FIG. 3, the first lens group G1 is made up of a cemented lens consisting of a negative meniscus lens convex on an object side thereof and a double-convex lens, and the second lens group G2 is made up of a double-concave lens and a positive lens. In the rear of the second lens group G2 there is located a stop S. The third lens group G3 is made up of a double-convex lens, a positive meniscus lens convex on an object side thereof and a negative meniscus lens convex on an object side thereof, and the fourth lens group G4 is made up of one positive meniscus lens convex on an object side thereof. Three aspherical surfaces are used; one for the surface located nearest to the image plane side in the second lens group G2, one for the surface located nearest to the object side in the third lens group G3 and one for the surface located nearest to the object side in the fourth lens group G4. For zooming from the wide-angle end to the telephoto end, the first lens group G1 and the stop S remain fixed, the second lens group G2 moves from the object side to the image plane side, and the third and fourth lens groups G3 and G4 move from the image plane side to the object side while the space therebetween becomes wide, as indicated by arrows.

Figure 4:
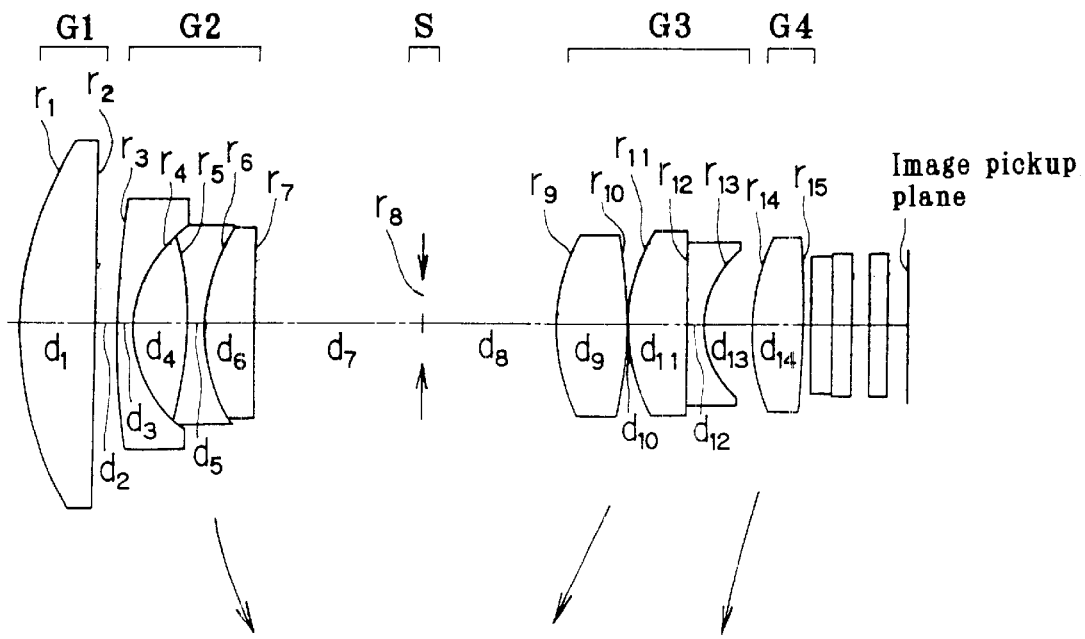
FIG. 4 is a sectional schematic illustrative of Example 4 of the zoom lens system according to the present invention, as viewed at the wide-angle end.

Example 4 is directed to a zoom lens system having a focal length of 3.144 to 9.070 mm and a field angle of 64.93° to 24.87°. As shown in FIG. 4, the first lens group G1 is made up of one positive meniscus lens convex on an object side thereof, and the second lens group G2 is made up of a negative meniscus lens convex on an object side thereof and a cemented lens consisting of a double-concave lens and a positive meniscus lens convex on an object side thereof. In the rear of the second lens group G2 there is located a stop S. The third lens group G3 is made up of a double-convex lens and a cemented lens consisting of a positive meniscus lens convex on an object side thereof and a negative meniscus lens, and the fourth lens group G4 is made up of one double-convex lens. Two aspherical surfaces are used; one for the surface located nearest to the object side in the third lens group G3 and another for the surface located nearest to the object side in the fourth lens group G4. For zooming from the wide-angle end to the telephoto end, the first lens group G1 and the stop S remain fixed, the second lens group G2 moves from the object side to the image plane side, and the third and fourth lens groups G3 and G4 move from the image plane side to the object side while the space therebetween becomes wide, as indicated by arrows.

Figure 5:
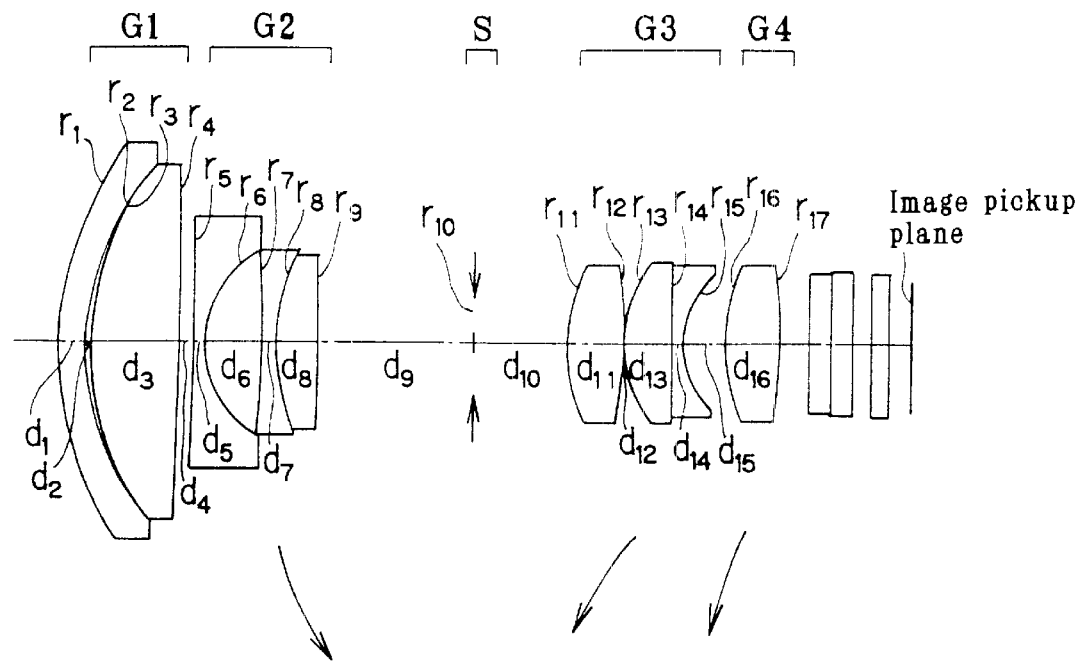
FIG. 5 is a sectional schematic illustrative of Example 5 of the zoom lens system according to the present invention, as viewed at the wide-angle end.

Example 5 is directed to a zoom lens system having a focal length of 3.578 to 10.193 mm and a field angle of 68.30° to 24.54°. As shown in FIG. 5, the first lens group G1 is made up of a negative meniscus lens convex on an object side thereof and a positive meniscus lens convex on an object side thereof, and the second lens group G2 is made up of a negative meniscus lens convex on an object side thereof and a cemented lens consisting of a double-concave lens and a positive meniscus lens convex on an object side thereof. In the rear of the second lens group G2 there is located a stop S. The third lens group G3 is made up of a double-convex lens and a cemented lens consisting of a positive meniscus lens convex on an object side thereof and a negative meniscus lens convex on an object side thereof, and the fourth lens group G4 is made up of one double-convex lens. Three aspherical surfaces are used; one for the surface located nearest to the image plane side in the second lens group G2, one for the surface located nearest to the object side in the third lens group G3 and one for the surface located nearest to the object side in the fourth lens group G4. For zooming from the wide-angle end to the telephoto end, the first lens group G1 and the stop S remain fixed, the second lens group G2 moves from the object side to the image plane side, and the third and fourth lens groups G3 and G4 move from the image plane side to the object side while the space therebetween becomes wide, as indicated by arrows.

In Example 5, it is noted that both the object-side positive lens $L_{31}$ and cemented lens $L_{32}$ in the third lens group G3 are held while the peripheral edges of the convex surfaces thereof abut peripherally or at several spots against a lens holder 1, so that decentration errors likely to have an influence on performance can be reduced.

Figure 6:
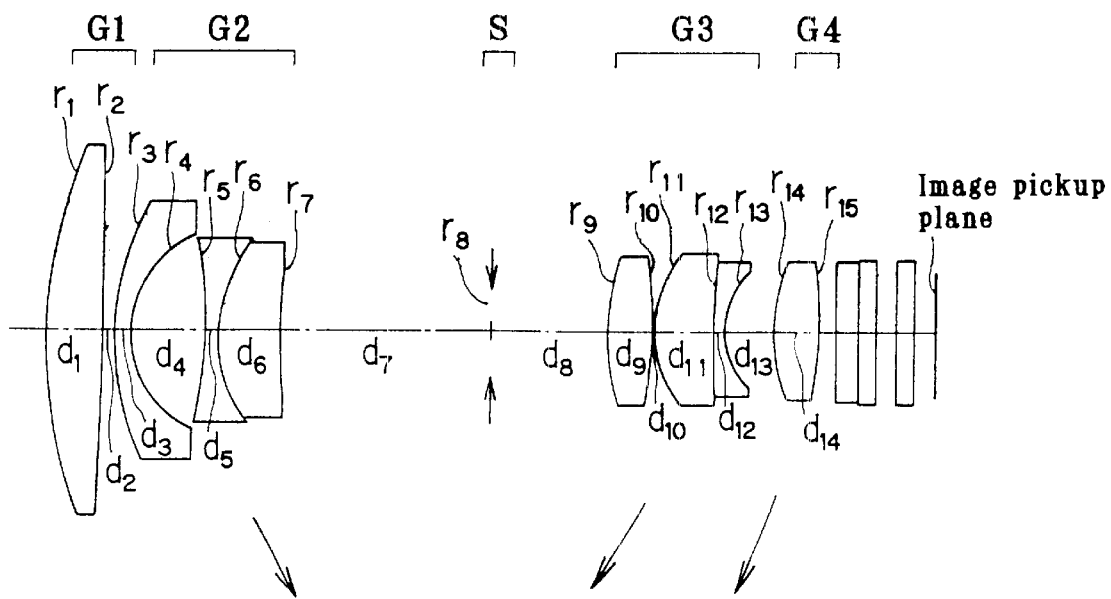
FIG. 6 is a sectional schematic illustrative of Example 6 of the zoom lens system according to the present invention, as viewed at the wide-angle end.

Example 6 is directed to a zoom lens system having a focal length of 2.478 to 7.162 mm and a field angle of 67.32° to 25.95°. As shown in FIG. 6, the first lens group G1 is made up of one plano-convex lens, and the second lens group G2 is made up of a negative meniscus lens convex on an object side thereof and a cemented lens consisting of a double-concave lens and a positive meniscus lens convex on an object side thereof. In the rear of the second lens group G2 there is located a stop S. The third lens group G3 is made up of a double-convex lens and a cemented lens consisting of a positive meniscus lens convex on an object side thereof and a negative meniscus lens convex on an object side thereof, and the fourth lens group G4 is made up of one double-convex lens. Two aspherical surfaces are used; one for the surface located nearest to the object side in the third lens group G3 and another for the surface located nearest to the object side in the fourth lens group G4. For zooming from the wide-angle end to the telephoto end, the first lens group G1 and the stop S remain fixed, the second lens group G2 moves from the object side to the image plane side, and the third and fourth lens groups G3 and G4 move from the image plane side to the object side while the space therebetween becomes wide, as indicated by arrows.

Figure 7:
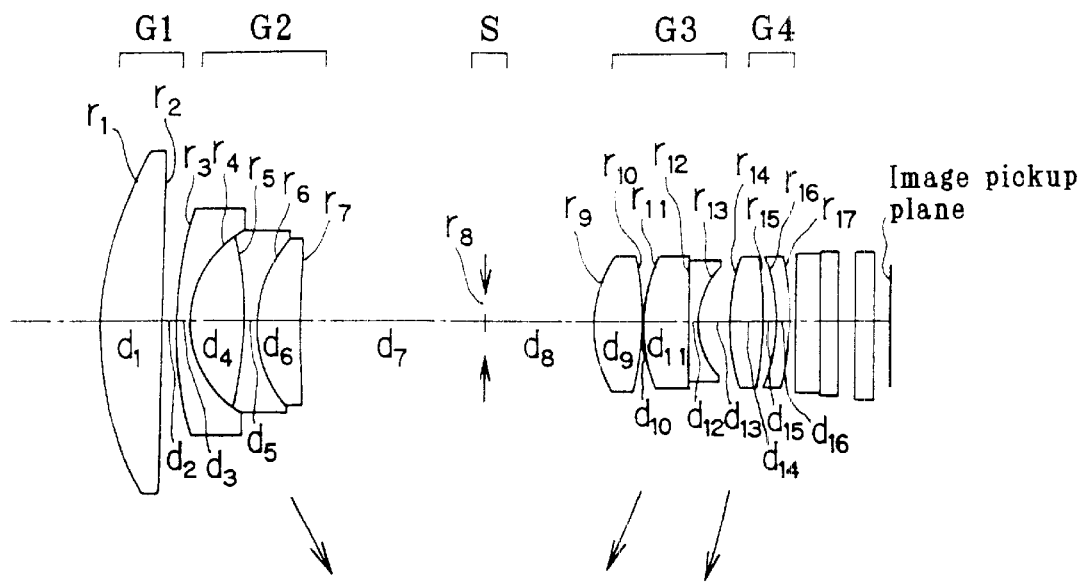
FIG. 7 is a sectional schematic illustrative of Example 7 of the zoom lens system according to the present invention, as viewed at the wide-angle end.

Example 7 is directed to a zoom lens system having a focal length of 2.976 to 8.549 mm and a field angle of 67.68° to 26.08°. As shown in FIG. 7, the first lens group G1 is made up of one plano-convex lens, and the second lens group G2 is made up of a negative meniscus lens convex on an object side thereof and a cemented lens consisting of a double-concave lens and a positive meniscus lens convex on an object side thereof. In the rear of the second lens group G2 there is located a stop S. The third lens group G3 is made up of a double-convex lens and a cemented lens consisting of a positive meniscus lens convex on an object side thereof and a negative meniscus lens convex on an object side thereof, and the fourth lens group G4 is made up of a double-convex lens and a negative meniscus lens convex on an image plane side thereof. One aspherical surface is used for the surface located nearest to the object side in the third lens group G3. For zooming from the wide-angle end to the telephoto end, the first lens group G1 and the stop S remain fixed, the second lens group G2 moves from the object side to the image plane side, and the third and fourth lens groups G3 and G4 move from the image plane side to the object side while the space therebetween becomes wide, as indicated by arrows.

Figure 8:
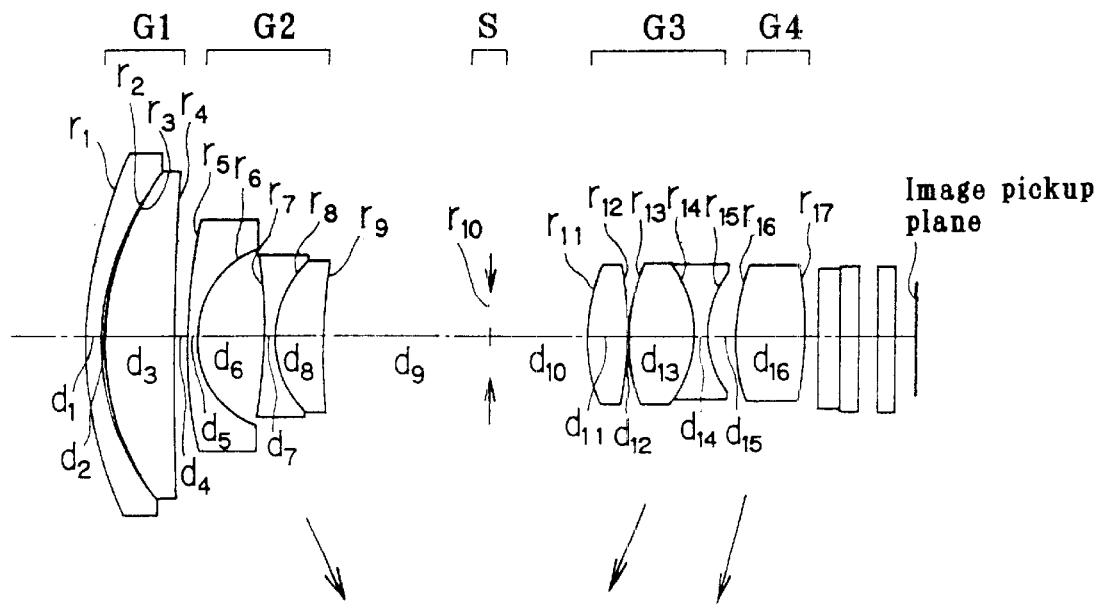
FIG. 8 is a sectional schematic illustrative of Example 8 of the zoom lens system according to the present invention, as viewed at the wide-angle end.

Example 8 is directed to a zoom lens system having a focal length of 4.093 to 11.875 mm and a field angle of 67.80° to 26.08°. As shown in FIG. 8, the first lens group G1 is made up of a negative meniscus lens convex on an object side thereof and a positive meniscus lens convex on an object side thereof, and the second lens group G2 is made up of a negative meniscus lens convex on an object side thereof and a cemented lens consisting of a double-concave lens and a positive meniscus lens convex on an object side thereof. In the rear of the second lens group G2 there is located a stop S. The third lens group G3 is made up of a double-convex lens and a cemented lens consisting of a double-convex lens and a double-concave lens, and the fourth lens group is made up of one double-convex lens. Two aspherical surfaces are used; one for the surface located nearest to the object side in the third lens group G3 and another for the surface located nearest to the object side in the fourth lens group G4. For zooming from the wide-angle end to the telephoto end, the first lens group G1 and the stop S remain fixed, the second lens group G2 moves from the object side to the image plane side, and the third and fourth lens groups G3 and G4 move from the image plane side to the object side while the space therebetween becomes wide, as indicated by arrows.

Figure 9:
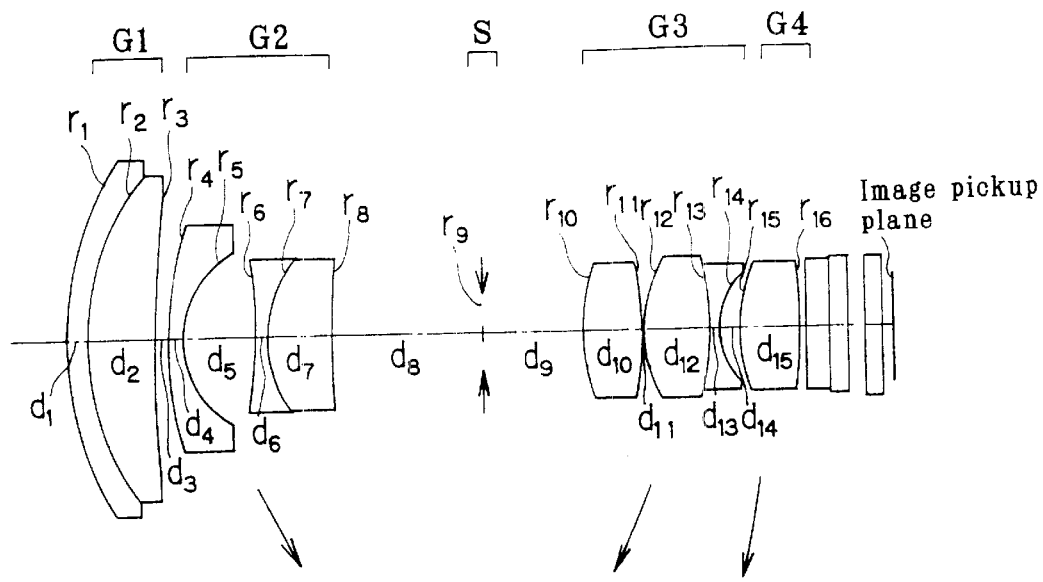
FIG. 9 is a sectional schematic illustrative of Example 9 of the zoom lens system according to the present invention, as viewed at the wide-angle end.

Example 9 is directed to a zoom lens system having a focal length of 3.281 to 9.500 mm and a field angle of 67.69° to 26.08°. As shown in FIG. 9, the first lens group G1 is made up of a cemented lens consisting of a negative meniscus lens convex on an object side thereof and a positive meniscus lens convex on an object side thereof, and the second lens group G2 is made up of a negative meniscus lens convex on an object side thereof and a cemented lens consisting of a double-concave lens and a positive meniscus lens convex on an object side thereof. In the rear of the second lens group G2 there is located a stop S. The third lens group G3 is made up of a double-convex lens and a cemented lens consisting of a double-convex lens and a double-concave lens, and the fourth lens group G4 is made up of one double-convex lens. Two aspherical surfaces are used; one for the surface located nearest to the object side in the third lens group G3 and another for the surface located nearest to the object side in the fourth lens group G4. For zooming from the wide-angle end to the telephoto end, the first lens group G1 and the stop S remain fixed, the second lens group G2 moves from the object side to the image plane side, and the third and fourth lens groups G3 and G4 move from the image plane side to the object side while the space therebetween becomes wide, as indicated by arrows.

Figure 10:
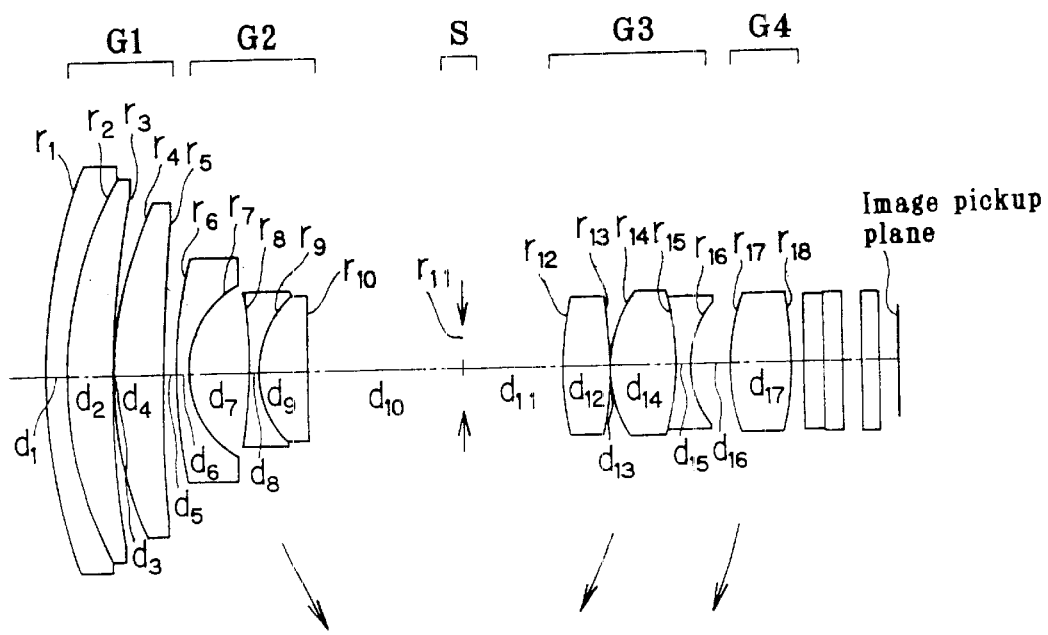
FIG. 10 is a sectional schematic illustrative of Example 10 of the zoom lens system according to the present invention, as viewed at the wide-angle end.
Figure 11:
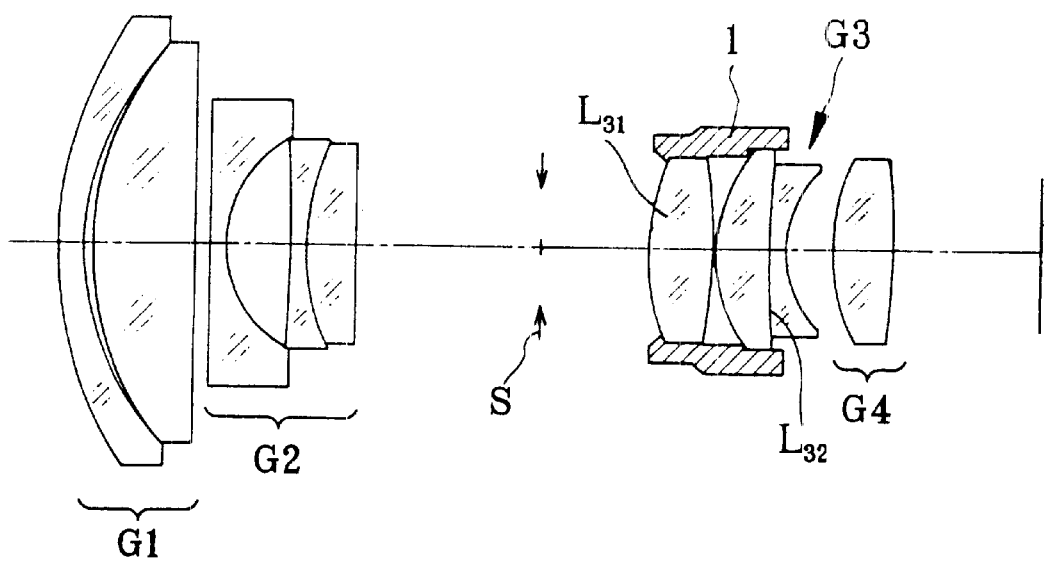
FIG. 11 is illustrative of a holding structure for the third lens group in Example 5.

Example 10 is directed to a zoom lens system having a focal length of 3.634 to 10.687 mm and a field angle of 68.52° to 26.08°. As shown in FIG. 10, the first lens group G1 is made up of a cemented lens consisting of a negative meniscus lens convex on an object side thereof and a positive meniscus lens convex on an object side thereof, and the second lens group G2 is made up of a negative meniscus lens convex on an object side thereof and a cemented lens consisting of a double-concave lens and a positive meniscus lens convex on an object side thereof. In the rear of the second lens group G2 there is located a stop S. The third lens group G3 is made up of a double-convex lens and a cemented lens consisting of a double-convex lens and a double-concave lens, and the fourth lens group G4 is made up of one double-convex lens. Two aspherical surfaces are used; one for the surface located nearest to the object side in the third lens group G3 and another for the surface located nearest to the object side in the fourth lens group G4. For zooming from the wide-angle end to the telephoto end, the first lens group G1 and the stop S remain fixed, the second lens group G2 moves from the object side to the image plane side, and the third and fourth lens groups G3 and G4 move from the image plane side to the object side while the space therebetween becomes wide, as indicated by arrows.

Set out below are numerical data on each example, with the unit of length being mm. Symbols used hereinafter but not hereinbefore have the following meanings.

f: the focal length of the zoom lens system,
$F_{NO}$: an F-number,
$f_B$: a back focus as calculated on an air basis,
$r_1, r_2, \ldots$: the radius of curvature of each lens surface,
$d_1, d_2, \ldots$: the separation between adjacent lens surfaces,
$n_{d1}, n_{d2}, \ldots$: the d-line refractive index of each lens, and
$v_{d1}, v_{d2}, \ldots$: the Abbe number of each lens.

Here let x denote an optical axis provided that the direction of propagation of light is positive and y represent a direction perpendicular to the optical axis. Then, aspherical shape is given by $$x=(y^2/r)/[1+\{1-(K+1)(y/r)^2\}^{1/2}]+A_4y^4+A_6y^6+A_8y^8+A_{10}y^{10}+A_{12}y^{12}$$

where r is the paraxial radius of curvature, K is a conical coefficient, and $A_4, A_6, A_8, A_{10}$ and $A_{12}$ are the fourth, sixth, eighth, tenth and twelfth aspherical coefficients, respectively.

EXAMPLE 1

$f$=3.643~6.310~10.420

$F_{NO}$=2.79~3.22~4.11

$f_B$=3.43~3.73~4.11

| | | |
|---|---|---|
| $r_1$ = 123.446 | $d_1$ = 0.79 | $n_{d1}$ = 1.84666 $v_{d1}$ = 23.78 |
| $r_2$ = 26.028 | $d_2$ = 2.63 | $n_{d2}$ = 1.48749 $v_{d2}$ = 70.23 |
| $r_3$ = −37.648 | $d_3$ = 0.12 | |
| $r_4$ = 9.745 | $d_4$ = 2.16 | $n_{d3}$ = 1.69680 $v_{d3}$ = 55.53 |
| $r_5$ = 41.109 | $d_5$ = (Variable) | |
| $r_6$ = 49.306 | $d_6$ = 0.56 | $n_{d4}$ = 1.77250 $v_{d4}$ = 49.60 |
| $r_7$ = 3.668 | $d_7$ = 1.97 | |
| $r_8$ = −6.439 | $d_8$ = 0.56 | $n_{d5}$ = 1.48749 $v_{d5}$ = 70.21 |
| $r_9$ = 7.824 | $d_9$ = 1.19 | $n_{d6}$ = 1.84666 $v_{d6}$ = 23.78 |
| $r_{10}$ = −92.465 | $d_{10}$ = (Variable) | |
| $r_{11}$ = ∞ (Stop) | $d_{11}$ = (Variable) | |
| $r_{12}$ = 7.726 (Aspheric) | $d_{12}$ = 1.29 | $n_{d7}$ = 1.58913 $v_{d7}$ = 61.18 |
| $r_{13}$ = −15.280 | $d_{13}$ = 0.10 | |
| $r_{14}$ = 5.743 | $d_{14}$ = 1.73 | $n_{d8}$ = 1.72916 $v_{d8}$ = 54.68 |
| $r_{15}$ = −8.215 | $d_{15}$ = 0.20 | |
| $r_{16}$ = 17.851 | $d_{16}$ = 0.46 | $n_{d9}$ = 1.84666 $v_{d9}$ = 23.78 |
| $r_{17}$ = 2.797 | $d_{17}$ = (Variable) | |
| $r_{18}$ = 6.406 | $d_{18}$ = 1.07 | $n_{d10}$ = 1.72916 $v_{d10}$ = 54.68 |
| $r_{19}$ = 21.794 | | |

Zooming Spaces

| f | 3.643 | 6.310 | 10.420 |
|---|---|---|---|
| $d_5$ | 0.64 | 2.95 | 4.22 |
| $d_{10}$ | 4.43 | 2.13 | 0.86 |
| $d_{11}$ | 3.24 | 2.25 | 0.62 |
| $d_{17}$ | 1.61 | 2.30 | 3.55 |

Aspherical Coefficients
12 th surface $K$=−0.218

$A_4$=−3.12469×10$^{-3}$ $A_6$=−2.00580×10$^{-4}$ $A_8$2.58848×10$^{-5}$ $A_{10}$=−3.98934×10$^{-6}$ $|F_2/F_3|$0.714

$F_3/F_4$-0.539

$|\beta_{2T}|$=0.897

$|L_3/L_2|$=0.73

$(F_{3,4}w)/IH$=2.44

$F_1/IH$=6.97

$IH$=2.25

EXAMPLE 2

$f$=2.924~5.049~8.425

$F_{NO}$=2.78~3.39~4.22

$f_B$=2.69~3.00~4.18

| | | |
|---|---|---|
| $r_1 = 9.603$ | $d_1 = 0.64$ | $n_{d1} = 1.84666$ $\nu_{d1} = 23.78$ |
| $r_2 = 6.804$ | $d_2 = 2.74$ | $n_{d2} = 1.60311$ $\nu_{d2} = 60.64$ |
| $r_3 = 121.247$ | $d_3 =$ (Variable) | |
| $r_4 = 21.867$ | $d_4 = 0.41$ | $n_{d3} = 1.65160$ $\nu_{d3} = 58.55$ |
| $r_5 = 2.740$ | $d_5 = 1.87$ | |
| $r_6 = -17.627$ | $d_6 = 0.37$ | $n_{d4} = 1.56384$ $\nu_{d4} = 60.67$ |
| $r_7 = 10.992$ | $d_7 = -0.01$ | |
| $r_8 = 4.352$ | $d_8 = 0.93$ | $n_{d5} = 1.80518$ $\nu_{d5} = 25.42$ |
| $r_9 = 6.985$ | $d_9 =$ (Variable) | |
| $r_{10} = \infty$ (Stop) | $d_{10} =$ (Variable) | |
| $r_{11} = 6.533$ (Aspheric) | $d_{11} = 1.96$ | $n_{d6} = 1.67790$ $\nu_{d6} = 55.34$ |
| $r_{12} = -6.275$ | $d_{12} = 0.45$ | |
| $r_{13} = 6.079$ | $d_{13} = 1.25$ | $n_{d7} = 1.60311$ $\nu_{d7} = 60.64$ |
| $r_{14} = -9.868$ | $d_{14} = 0.07$ | |
| $r_{15} = 25.676$ | $d_{15} = 0.37$ | $n_{d8} = 1.84666$ $\nu_{d8} = 23.78$ |
| $r_{16} = 2.938$ | $d_{16} =$ (Variable) | |
| $r_{17} = 7.544$ | $d_{17} = 0.91$ | $n_{d9} = 1.58913$ $\nu_{d9} = 61.14$ |
| $r_{18} = -46.010$ | | |

Zooming Spaces

| | | | |
|---|---|---|---|
| f | 2.924 | 5.049 | 8.425 |
| $d_3$ | 0.36 | 2.53 | 4.14 |
| $d_9$ | 4.46 | 2.29 | 0.69 |
| $d_{10}$ | 2.85 | 1.70 | 0.50 |
| $d_{16}$ | 1.02 | 1.85 | 1.88 |

Aspherical Coefficients
11 th surface $K=-0.218$ $A_4=-4.79076\times10^{-3}$ $A_6=7.18792\times10^{-4}$ $A_8=-2.84416\times10^{-4}$ $A_{10}=4.21243\times10^{-5}$ $|F_2/F_3|=0.837$ $F_3/F_4=0.475$ $|\beta_{2T}|=0.501$ $|L_3/L_2|=0.62$ $(F_{3,4}w)/IH=2.58$ $F_1/IH=10.99$ $IH=1.8$

EXAMPLE 3

$f=3.238\sim5.605\sim9.300$ $F_{NO}=2.79\sim3.35\sim4.33$ $f_B=3.05\sim3.45\sim4.42$

| | | |
|---|---|---|
| $r_1 = 11.229$ | $d_1 = 0.71$ | $n_{d1} = 1.84666$ $\nu_{d1} = 23.78$ |
| $r_2 = 8.678$ | $d_2 = 1.82$ | $n_{d2} = 1.60311$ $\nu_{d2} = 60.64$ |
| $r_3 = -4524.933$ | $d_3 =$ (Variable) | |
| $r_4 = -44.964$ | $d_4 = 0.49$ | $n_{d3} = 1.77250$ $\nu_{d3} = 49.60$ |
| $r_5 = 2.859$ | $d_5 = 1.07$ | |
| $r_6 = 10.754$ | $d_6 = 1.04$ | $n_{d4} = 1.80518$ $\nu_{d4} = 25.42$ |

-continued

| | | |
|---|---|---|
| $r_7 = \infty$ (Aspheric) | $d_7 =$ (Variable) | |
| $r_8 = \infty$ (Stop) | $d_8 =$ (Variable) | |
| $r_9 = 4.318$ (Aspheric) | $d_9 = 1.55$ | $n_{d5} = 1.58913$ $\nu_{d5} = 61.18$ |
| $r_{10} = -13.012$ | $d_{10} = 0.09$ | |
| $r_{11} = 4.720$ | $d_{11} = 1.16$ | $n_{d6} = 1.72916$ $\nu_{d6} = 54.68$ |
| $r_{12} = 30.878$ | $d_{12} = 0.09$ | |
| $r_{13} = 8.260$ | $d_{13} = 0.41$ | $n_{d7} = 1.84666$ $\nu_{d7} = 23.78$ |
| $r_{14} = 2.400$ | $d_{14} =$ (Variable) | |
| $r_{15} = 5.989$ (Aspheric) | $d_{15} = 1.03$ | $n_{d8} = 1.58913$ $\nu_{d8} = 61.14$ |
| $r_{16} = 666.490$ | | |

Zooming Spaces

| | | | |
|---|---|---|---|
| f | 3.238 | 5.605 | 9.300 |
| $d_3$ | 0.68 | 3.22 | 4.76 |
| $d_7$ | 4.85 | 2.31 | 0.76 |
| $d_8$ | 3.32 | 2.13 | 0.55 |
| $d_{14}$ | 1.22 | 2.01 | 2.63 |

Aspherical Coefficients
7 th surface $K=0.000$ $A_4=-2.85671\times10^{-3}$ $A_6=-5.00585\times10^{-6}$ $A_8=-4.55482\times10^{-5}$ $A_{10}=1.15287\times10^{-6}$ 9 th surface $K=-0.218$ $A_4=-2.53050\times10^{-3}$ $A_6=-3.22409\times10^{-5}$ $A_8=1.05400\times10^{-5}$ $A_{10}=-1.24302\times10^{-6}$ 15 th surface $K=0.000$ $A_4=-1.11182\times10^{-3}$ $A_6=2.52212\times10^{-4}$ $A_8=-6.19443\times10^{-5}$ $A_{10}=1.11195\times10^{-5}$ $|F_2/F_3|=0.866$ $|F_3/F_4|=0.591$ $|\beta_{2T}|=0.575$ $|L_3/L_2|=0.68$ $(F_{3,4}w)/IH=2.52$ $F_1/IH=10.06$ $IH=2.0$

EXAMPLE 4

$f=3.144\sim5.518\sim9.070$ $F_{NO}=2.78\sim3.34\sim4.35$ $f_B=2.85\sim3.29\sim4.40$

| | | |
|---|---|---|
| $r_1 = 9.466$ | $d_1 = 2.06$ | $n_{d1} = 1.48749$ $\nu_{d1} = 70.23$ |
| $r_2 = 325.991$ | $d_2 =$ (Variable) | |
| $r_3 = 19.366$ | $d_3 = 0.48$ | $n_{d2} = 1.84666$ $\nu_{d2} = 23.78$ |
| $r_4 = 3.135$ | $d_4 = 1.51$ | |
| $r_5 = -7.920$ | $d_5 = 0.46$ | $n_{d3} = 1.48749$ $\nu_{d3} = 70.23$ |
| $r_6 = 4.420$ | $d_6 = 1.49$ | $n_{d4} = 1.84666$ $\nu_{d4} = 23.78$ |
| $r_7 = 241.864$ | $d_7 =$ (Variable) | |
| $r_8 = \infty$ (Stop) | $d_8 =$ (Variable) | |
| $r_9 = 4.925$ (Aspheric) | $d_9 = 1.91$ | $n_{d5} = 1.56384$ $\nu_{d5} = 60.67$ |
| $r_{10} = -9.657$ | $d_{10} = 0.07$ | |
| $r_{11} = 4.433$ | $d_1 = 1.64$ | $n_{d6} = 1.77250$ $\nu_{d6} = 49.60$ |
| $r_{12} = 147.741$ | $d_{12} = 0.40$ | $n_{d7} = 1.84666$ $\nu_{d7} = 23.78$ |
| $r_{13} = 2.588$ | $d_{13} =$ (Variable) | |
| $r_{14} = 5.552$ (Aspheric) | $d_{14} = 1.40$ | $n_{d8} = 1.56384$ $\nu_{d8} = 60.67$ |
| $r_{15} = -26.965$ | | |

Zooming Spaces

| f | 3.144 | 5.518 | 9.070 |
|---|---|---|---|
| $d_2$ | 0.56 | 3.27 | 4.59 |
| $d_7$ | 4.78 | 2.27 | 0.74 |
| $d_8$ | 3.73 | 2.40 | 0.53 |
| $d_{13}$ | 1.29 | 2.16 | 2.95 |

Aspherical Coefficients
9 th surface $K=-0.218$ $A_4=-1.70776\times10^{-3}$ $A_6=3.80242\times10^{-6}$ $A_8=6.65158\times10^{-7}$ $A_{10}=-2.95559\times10^{-8}$ 14 th surface $K=0.000$ $A_4=-5.91729\times10^{-4}$ $A_6=-4.46239\times10^{-5}$ $A_8=1.89881\times10^{-5}$ $A_{10}=0$ $|F_2/F_3|=0.779$ $F_3/F_4=0.794$ $|\beta_{2T}|=0.586$ $|L_3/L_2|0.792$ $(F_{3,4}w)/IH=2.71$ $F_1/IH9.98$ $IH=2.0$

EXAMPLE 5

$f=3.538\sim6.063\sim10.193$ $F_{NO}=1.99\sim2.27\sim2.71$ $f_B=3.52\sim4.13\sim5.01$

| | | |
|---|---|---|
| $r_1 = 11.700$ | $d_1 = 0.75$ | $n_{d1} = 1.80518$ $\nu_{d1} = 25.42$ |
| $r_2 = 8.376$ | $d_2 = 0.22$ | |
| $r_3 = 8.983$ | $d_3 = 3.12$ | $n_{d2} = 1.69680$ $\nu_{d2} = 55.53$ |
| $r_4 = 1994.627$ | $d_4 =$ (Variable) | |
| $r_5 = 272.962$ | $d_5 = 0.51$ | $n_{d3} = 1.77250$ $\nu_{d3} = 49.60$ |
| $r_6 = 3.607$ | $d_6 = 1.90$ | |
| $r_7 = -67.501$ | $d_7 = 0.51$ | $n_{d4} = 1.48749$ $\nu_{d4} = 70.23$ |
| $r_8 = 6.854$ | $d_8 = 1.49$ | $n_{d5} = 1.72250$ $\nu_{d5} = 29.20$ |
| $r_9 = 47.648$ (Aspheric) | $d_9 =$ (Variable) | |
| $r_{10} = \infty$ (Stop) | $d_{10} =$ (Variable) | |
| $r_{11} = 5.926$ (Aspheric) | $d_{11} = 1.93$ | $n_{d6} = 1.66910$ $\nu_{d6} = 55.40$ |
| $r_{12} = -19.572$ | $d_{12} = 0.09$ | |
| $r_{13} = 4.844$ | $d_{13} = 1.64$ | $n_{d7} = 1.67790$ $\nu_{d7} = 55.34$ |
| $r_{14} = 51.623$ | $d_{14} = 0.45$ | $n_{d8} = 1.84666$ $\nu_{d8} = 23.78$ |
| $r_{15} = 3.195$ | $d_{15} =$ (Variable) | |
| $r_{16} = 6.105$ (Aspheric) | $d_{16} = 1.82$ | $n_{d9} = 1.66910$ $\nu_{d9} = 55.40$ |
| $r_{17} = -24.730$ | | |

Zooming Spaces

| f | 3.538 | 6.063 | 10.193 |
|---|---|---|---|
| $d_4$ | 0.49 | 3.25 | 5.27 |
| $d_9$ | 5.60 | 2.83 | 0.84 |
| $d_{10}$ | 3.20 | 2.06 | 0.60 |
| $d_{15}$ | 1.45 | 1.97 | 2.55 |

Aspherical Coefficients
9 th surface $K=0.000$ $A_4=-9.99655\times10^{-4}$ $A_6=3.86110\times10^{-5}$ $A_8=-1.20035\times10^{-5}$ $A_{10}=6.80269\times10^{-7}$ 11 th surface $K=-0.218$ $A_4=-6.82101\times10^{-4}$ $A_6=-1.21088\times10^{-5}$ $A_8=3.20658\times10^{-6}$ $A_{10}=-2.47777\times10^{-7}$ 16 th surface $K=0.000$ $A_4=-9.45299\times10^{-4}$ $A_6=2.83288\times10^{-5}$ $A_8=-2.50040\times10^{-7}$ $A_{10}=0$ $|F_2/F_3|0.628$ $F_3/F_4=1.088$ $|\beta_{2T}|=0.760$ $|L_3/L_2|=0.54$ $(F_{3,4}w)/IH=2.67$ $F_1/IH=8.73$ $IH=2.25$

EXAMPLE 6

$f=2.478\sim4.226\sim7.162$ $F_{NO}=2.03\sim2.36\sim2.91$ $f_B=2.83\sim3.44\sim4.66$

| | | |
|---|---|---|
| $r_1 = 13.758$ | $d_1 = 1.55$ | $n_{d1} = 1.48749 \; \nu_{d1} = 70.23$ |
| $r_2 = \infty$ | $d_2 =$ (Variable) | |
| $r_3 = 8.156$ | $d_3 = 0.47$ | $n_{d2} = 1.84666 \; \nu_{d2} = 23.78$ |
| $r_4 = 3.020$ | $d_4 = 2.04$ | |
| $r_5 = -10.317$ | $d_5 = 0.38$ | $n_{d3} = 1.48749 \; \nu_{d3} = 70.23$ |
| $r_6 = 3.905$ | $d_6 = 1.69$ | $n_{d4} = 1.84666 \; \nu_{d4} = 23.78$ |
| $r_7 = 15.206$ | $d_7 =$ (Variable) | |
| $r_8 = \infty$ (Stop) | $d_8 =$ (Variable) | |
| $r_9 = 6.594$ (Aspheric) | $d_9 = 1.28$ | $n_{d5} = 1.58913 \; \nu_{d5} = 61.30$ |
| $r_{10} = -13.376$ | $d_{10} = 0.08$ | |
| $r_{11} = 3.521$ | $d_{11} = 1.63$ | $n_{d6} = 1.77250 \; \nu_{d6} = 49.60$ |
| $r_{12} = 32.979$ | $d_{12} = 0.34$ | $n_{d7} = 1.84666 \; \nu_{d7} = 23.78$ |
| $r_{13} = 2.478$ | $d_{13} =$ (Variable) | |
| $r_{14} = 5.082$ (Aspheric) | $d_{14} = 1.23$ | $n_{d8} = 1.58913 \; \nu_{d8} = 61.30$ |
| $r_{15} = -11.553$ | | |

Zooming Spaces

| f | 2.478 | 4.226 | 7.162 |
|---|---|---|---|
| $d_2$ | 0.38 | 3.62 | 5.92 |
| $d_7$ | 6.07 | 2.83 | 0.56 |
| $d_8$ | 3.25 | 2.05 | 0.56 |
| $d_{13}$ | 1.30 | 1.88 | 2.14 |

Aspherical Coefficients
9 th surface $K=0.000$ $A_4=-8.83776\times10^{-4}$ $A_6=-1.79814\times10^{-4}$ $A_8=6.59986\times10^{-5}$ $A_{10}=-8.05802\times10^{-6}$ $A_{12}=5.90942\times10^{-8}$ 14 th surface $K=0.000$ $A_4=-1.88373\times10^{-3}$ $A_6=-1.31653\times10^{-4}$ $A_8=3.07847\times10^{-4}$ $A_{10}=-33087\times10^{-4}$ $A_{12}=1.81422\times10^{-5}$ $|F_2/F_3|=0.77$ $F_3/F_4=1.12$ $|\beta_{2T}|=0.35$ $|L_3/L_2|=0.48$ $(F_{3,4}w)/IH=3.06$ $F_1/IH=17.10$ $IH=1.5$

EXAMPLE 7

$f=2.976\sim5.065\sim8.549$ $F_{NO}=2.64\sim3.01\sim3.85$ $f_B=2.91\sim3.47\sim4.54$

| | | |
|---|---|---|
| $r_1 = 12.405$ | $d_1 = 1.98$ | $n_{d1} = 1.48749 \; \nu_{d1} = 70.23$ |
| $r_2 = \infty$ | $d_2 =$ (Variable) | |
| $r_3 = 15.574$ | $d_3 = 0.45$ | $n_{d2} = 1.84666 \; \nu_{d2} = 23.78$ |
| $r_4 = 3.425$ | $d_4 = 1.88$ | |
| $r_5 = -11.707$ | $d_5 = 0.43$ | $n_{d3} = 1.48749 \; \nu_{d3} = 70.23$ |
| $r_6 = 4.402$ | $d_6 = 1.51$ | $n_{d4} = 1.84666 \; \nu_{d4} = 23.78$ |
| $r_7 = 34.871$ | $d_7 =$ (Variable) | |
| $r_8 = \infty$ (Stop) | $d_8 =$ (Variable) | |
| $r_9 = 4.077$ (Aspheric) | $d_9 = 1.55$ | $n_{d5} = 1.58913 \; \nu_{d5} = 61.28$ |
| $r_{10} = -12.990$ | $d_{10} = 0.09$ | |
| $r_{11} = 6.194$ | $d_{11} = 1.40$ | $n_{d6} = 1.77250 \; \nu_{d6} = 49.60$ |
| $r_{12} = 36.559$ | $d_{12} = 0.41$ | $n_{d7} = 1.84666 \; \nu_{d7} = 23.78$ |
| $r_{13} = 2.869$ | $d_{13} =$ (Variable) | |
| $r_{14} = 7.598$ | $d_{14} = 1.14$ | $n_{d8} = 1.80400 \; \nu_{d8} = 46.57$ |
| $r_{15} = -10.188$ | $d_{15} = 0.41$ | |
| $r_{16} = -6.224$ | $d_{16} = 0.45$ | $n_{d9} = 1.84666 \; \nu_{d9} = 23.78$ |
| $r_{17} = -9.384$ | | |

Zooming Spaces

| f | 2.976 | 5.065 | 8.549 |
|---|---|---|---|
| $d_2$ | 0.45 | 3.82 | 5.95 |
| $d_7$ | 6.18 | 2.81 | 0.68 |
| $d_8$ | 1.61 | 2.46 | 0.59 |
| $d_{13}$ | 1.07 | 1.67 | 2.49 |

Aspherical Coefficients
9 th surface $K=0.000$ $A_4=-2.68388\times10^{-3}$ $A_6=8.86517\times10^{-5}$ $A_8=-6.80012\times10^{-5}$ $A_{10}=1.65400\times10^{-5}$ $A_{12}=-1.50666\times10^{-6}$ $F_2/F_3=0.76$ $F_3/F_4=1.09$ $|\beta_{2T}|=0.50$ $|L_3/L_2|=0.55$ $(F_{3.4}w)/IH=2.79$ $F_1/IH=12.85$ $IH=1.8$

EXAMPLE 8

$f=4.093\sim7.041\sim11.875$ $F_{NO}=2.02\sim2.33\sim2.80$ $f_B=4.53\sim5.42\sim6.90$

| | | |
|---|---|---|
| $r_1 = 18.108$ | $d_1 = 0.94$ | $n_{d1} = 1.84666$ $\nu_{d1} = 23.78$ |
| $r_2 = 12.307$ | $d_2 = 0.14$ | |
| $r_3 = 12.753$ | $d_3 = 3.10$ | $n_{d2} = 1.77250$ $\nu_{d2} = 49.60$ |
| $r_4 = 122.843$ | $d_4 = $ (Variable) | |
| $r_5 = 26.311$ | $d_5 = 0.63$ | $n_{d3} = 1.77250$ $\nu_{d3} = 49.60$ |
| $r_6 = 4.431$ | $d_6 = 2.94$ | |
| $r_7 = -26.320$ | $d_7 = 0.59$ | $n_{d4} = 1.57250$ $\nu_{d4} = 57.74$ |
| $r_8 = 4.874$ | $d_8 = 2.27$ | $n_{d5} = 1.80100$ $\nu_{d5} = 34.97$ |
| $r_9 = 32.145$ | $d_9 = $ (Variable) | |
| $r_{10} = \infty$ (Stop) | $d_{10} = $ (Variable) | |
| $r_{11} = 8.399$ (Aspheric) | $d_{11} = 1.78$ | $n_{d6} = 1.58913$ $\nu_{d6} = 61.30$ |
| $r_{12} = -20.918$ | $d_{12} = 0.13$ | |
| $r_{13} = 10.353$ | $d_{13} = 3.13$ | $n_{d7} = 1.77250$ $\nu_{d7} = 49.60$ |
| $r_{14} = -5.691$ | $d_{14} = 0.56$ | $n_{d8} = 1.68893$ $\nu_{d8} = 31.07$ |
| $r_{15} = 4.778$ | $d_{15} = $ (Variable) | |
| $r_{16} = 8.696$ (Aspheric) | $d_{16} = 3.13$ | $n_{d9} = 1.58913$ $\nu_{d9} = 61.30$ |
| $r_{17} = -16.508$ | | |

Zooming Spaces

| f | 4.093 | 7.041 | 11.875 |
|---|---|---|---|
| $d_4$ | 0.63 | 4.63 | 7.56 |
| $d_9$ | 7.87 | 3.87 | 0.94 |
| $d_{10}$ | 4.43 | 2.75 | 0.84 |
| $d_{15}$ | 1.26 | 2.05 | 2.48 |

Aspherical Coefficients
11 th surface $K=0.000$ $A_4=-4.74324\times10^{-4}$ $A_6=-2.42146\times10^{-5}$ $A_8=2.49585\times10^{-6}$ $A_{10}=-1.17216\times10^{-7}$ 16 th surface $K=0.000$ $A_4=-6.18094\times10^{-4}$ $A_6=-7.96643\times10^{-5}$ $A_8=-1.16593\times10^{-6}$ $A_{10}=-6.32501\times10^{-7}$ $|F_2/F_3|0.64$ $F_3/F_4=1.07$ $|\beta_{2T}|=0.56$ $|L_3/L_2|=0.52$ $(F_{3.4}w)/IH=2.81$ $F_1/IH=10.96$ $IH=2.5$

EXAMPLE 9

$f=3.281\sim5.633\sim9.500$ $F_{NO}=2.03\sim2.41\sim2.98$ $f_B=2.98\sim3.50\sim4.60$

| | | |
|---|---|---|
| $r_1 = 13.782$ | $d_1 = 0.90$ | $n_{d1} = 1.84666$ $\nu_{d1} = 23.78$ |
| $r_2 = 11.125$ | $d_2 = 2.64$ | $n_{d2} = 1.69680$ $\nu_{d2} = 55.53$ |
| $r_3 = 73.145$ | $d_3 = $ (Variable) | |
| $r_4 = 16.578$ | $d_4 = 0.60$ | $n_{d3} = 1.84666$ $\nu_{d3} = 23.78$ |
| $r_5 = 3.821$ | $d_5 = 2.97$ | |
| $r_6 = -16.432$ | $d_6 = 0.47$ | $n_{d4} = 1.58913$ $\nu_{d4} = 61.14$ |
| $r_7 = 4.721$ | $d_7 = 2.50$ | $n_{d5} = 1.84666$ $\nu_{d5} = 23.78$ |
| $r_8 = 36.357$ | $d_8 = $ (Variable) | |
| $r_9 = \infty$ (Stop) | $d_9 = $ (Variable) | |
| $r_{10} = 6.997$ (Aspheric) | $d_{10} = 2.32$ | $n_{d6} = 1.58913$ $\nu_{d6} = 61.30$ |
| $r_{11} = -13.157$ | $d_{11} = 0.10$ | |
| $r_{12} = 5.948$ | $d_{12} = 2.50$ | $n_{d7} = 1.77250$ $\nu_{d7} = 49.60$ |
| $r_{13} = -9.882$ | $d_{13} = 0.45$ | $n_{d8} = 1.80518$ $\nu_{d8} = 25.42$ |
| $r_{14} = 3.525$ | $d_{14} = $ (Variable) | |
| $r_{15} = 6.328$ (Aspheric) | $d_{15} = 2.50$ | $n_{d9} = 1.58913$ $\nu_{d9} = 61.30$ |
| $r_{16} = -18.262$ | | |

Zooming Spaces

| f | 3.281 | 5.633 | 9.500 |
|---|---|---|---|
| $d_3$ | 0.50 | 3.55 | 5.78 |
| $d_8$ | 6.03 | 2.99 | 0.75 |
| $d_9$ | 3.91 | 2.44 | 0.68 |
| $d_{14}$ | 0.64 | 1.59 | 2.27 |

Aspherical Coefficients
10 th surface $K=0.000$ $A_4=-6.74025\times10^{-4}$ $A_6=-3.39527\times10^{-5}$ $A_8=6.17490\times10^{-6}$ $A_{10}=-3.69154\times10^{-7}$ 15 th surface $K=0.000$ $A_4=-1.22978\times10^{-3}$ $A_6=2.57259\times10^{-4}$ $A_8=-5.94053\times10^{-5}$ $A_{10}=5.10256\times10^{-5}$ $|F_2/F_3|=0.72$ $F_3/F_4 0.96$ $|\beta_{2T}|=0.55$ $|L_3/L_2|=0.61$ $(F_{3.4}w)/IH=2.73$ $F_1/IH$=11.41

$IH$=2.0

EXAMPLE 10

$f$=3.634~6.338~10.687

$F_{NO}$=2.03~2.36~2.86

$f_B$=4.06~5.03~6.69

| | | |
|---|---|---|
| $r_1$ = 25.537 | $d_1$ = 0.84 | $n_{d1}$ = 1.84666 $v_{d1}$ = 23.78 |
| $r_2$ = 17.128 | $d_2$ = 1.92 | $n_{d1}$ = 1.77250 $v_{d2}$ = 49.60 |
| $r_3$ = 41.101 | $d_3$ = 0.11 | |
| $r_4$ = 17.177 | $d4$ = 2.25 | $n_{d1}$ = 1.60311 $v_{d3}$ = 60.64 |
| $r_5$ = 64.686 | $d_5$ = (Variable) | |
| $r_6$ = 21.366 | $d_6$ = 0.56 | $n_{d1}$ = 1.80610 $v_{d4}$ = 40.92 |
| $r_7$ = 4.013 | $d_7$ = 2.78 | |
| $r_8$ = −19.517 | $d_8$ = 0.53 | $n_{d1}$ = 1.59551 $v_{d5}$ = 39.24 |
| $r_9$ = 4.450 | $d_9$ = 2.10 | $n_{d1}$ = 1.80518 $v_{d6}$ = 25.42 |
| $r_{10}$ = 34.830 | $d_{10}$ = (Variable) | |
| $r_{11}$ = ∞ (Stop) | $d_{11}$ = (Variable) | |
| $r_{12}$ = 11.333 (Aspheric) | $d_{12}$ = 2.15 | $n_{d1}$ = 1.58913 $v_{d7}$ = 61.30 |
| $r_{13}$ = −15.421 | $d_{13}$ = 0.11 | |
| $r_{14}$ = 6.624 | $d_{14}$ = 2.81 | $n_{d1}$ = 1.77250 $v_{d8}$ = 49.60 |
| $r_{15}$ = −9.336 | $d_{15}$ = 0.51 | $n_{d1}$ = 1.74077 $v_{d9}$ = 27.79 |
| $r_{16}$ = 4.319 | $d_{16}$ = (Variable) | |
| $r_{17}$ = 8.127 (Aspheric) | $d_{17}$ = 2.81 | $n_{d1}$ = 1.58913 $v_{d10}$ = 61.30 |
| $r_{18}$ = −13.550 | | |

Zooming Spaces

| f | 3.634 | 6.338 | 10.687 |
|---|---|---|---|
| $d_5$ | 0.56 | 4.10 | 6.61 |
| $d_{10}$ | 6.89 | 3.35 | 0.84 |
| $d_{11}$ | 4.43 | 2.65 | 0.76 |
| $d_{16}$ | 1.66 | 2.46 | 2.70 |

Aspherical Coefficients
12 th surface $K$=0.000

$A_4$=−2.72290×10$^{-4}$ $A_6$=−2.67214×10$^{-5}$ $A_8$=3.52082×10$^{-6}$ $A_{10}$=−1.72643×10$^{-7}$ 17 th surface $K$=0.000

$A_4$=−6.98015×10$^{-4}$ $A_6$=8.08033×10$^{-5}$ $A_8$=−1.17442×10$^{-5}$ $A_{10}$=6.68163×10$^{-7}$ $|F_2/F_3|$=0.59

$F_3/F_4$=1.08

$|\beta_{2T}|$=0.55

$|L_3/L_2|$=0.61

$(F_{3,4}w)/IH$=2.96

$F_1/IH$=11.19

$IH$=2.25

Figures 12A, 12B, 12C, 12D, 12E:
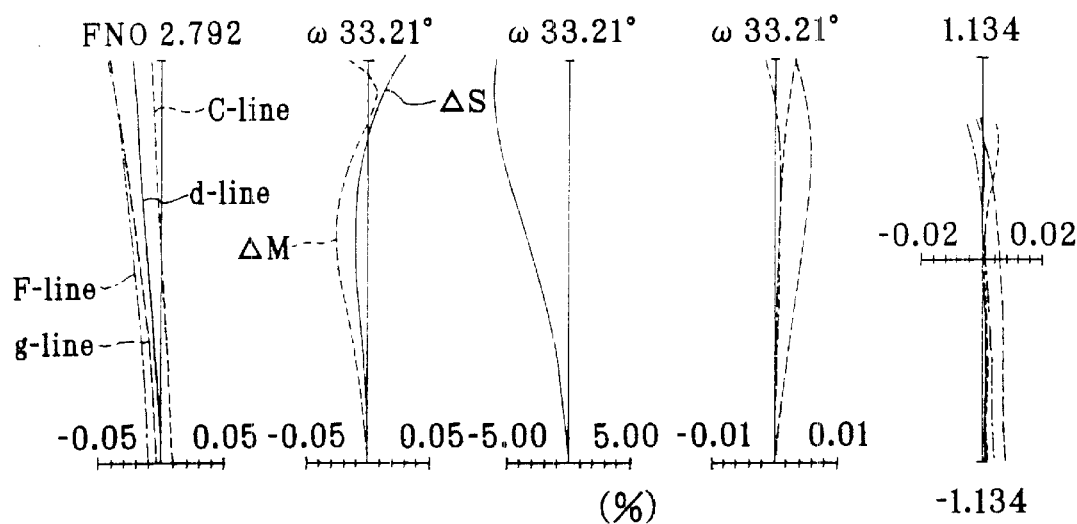
FIG. 12 is an aberration diagram for Example 1 at the wide-angle end.
Figures 13A, 13B, 13C, 13D, 13E:
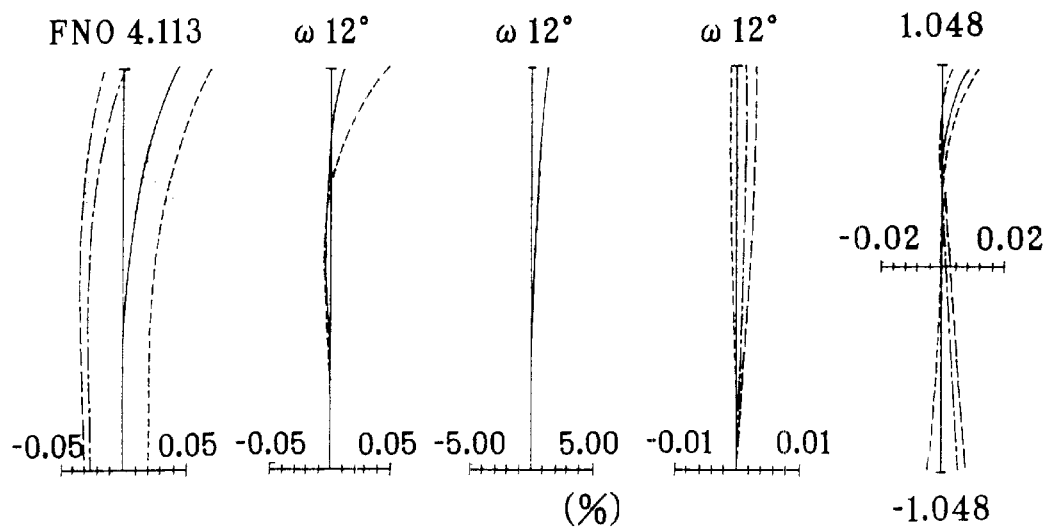
FIG. 13 is an aberration diagram for Example 1 at the telephoto end.

FIGS. 12 and 13 are aberration diagrams for Example 1 of the present zoom lens system at the wide-angle and telephoto ends, respectively, upon focused on an object point at infinity. In these drawings, (a), (b), (c), (d) and (e) represent spherical aberrations, astigmatism, distortion, chromatic aberration of magnification and coma, respectively. It is noted that ω stands for a half field angle.

The zoom lens system according to the present invention may be used on various image pickup systems using electronic image pickup devices such as CCD or CMOS sensors, as embodied below.

Figure 14:
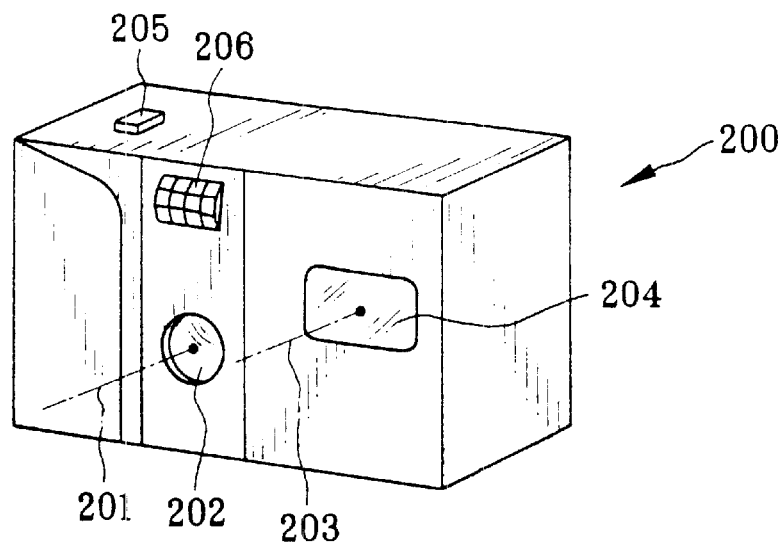
FIG. 14 is a front perspective view illustrative of the appearance of an electronic camera wherein the zoom lens system of the present invention is incorporated in the form of an objective optical system.
Figure 15:
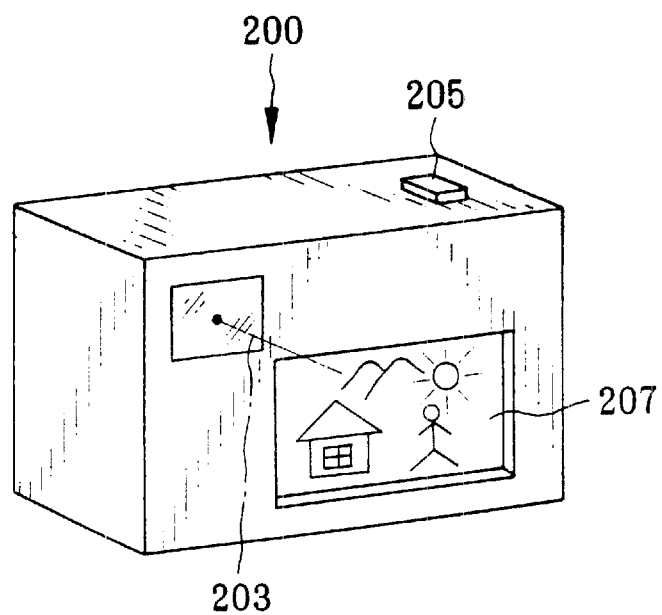
FIG. 15 is a rear perspective view illustrative of the electronic camera wherein the zoom lens system of the present invention is incorporated in the form of an objective optical system.
Figure 16:
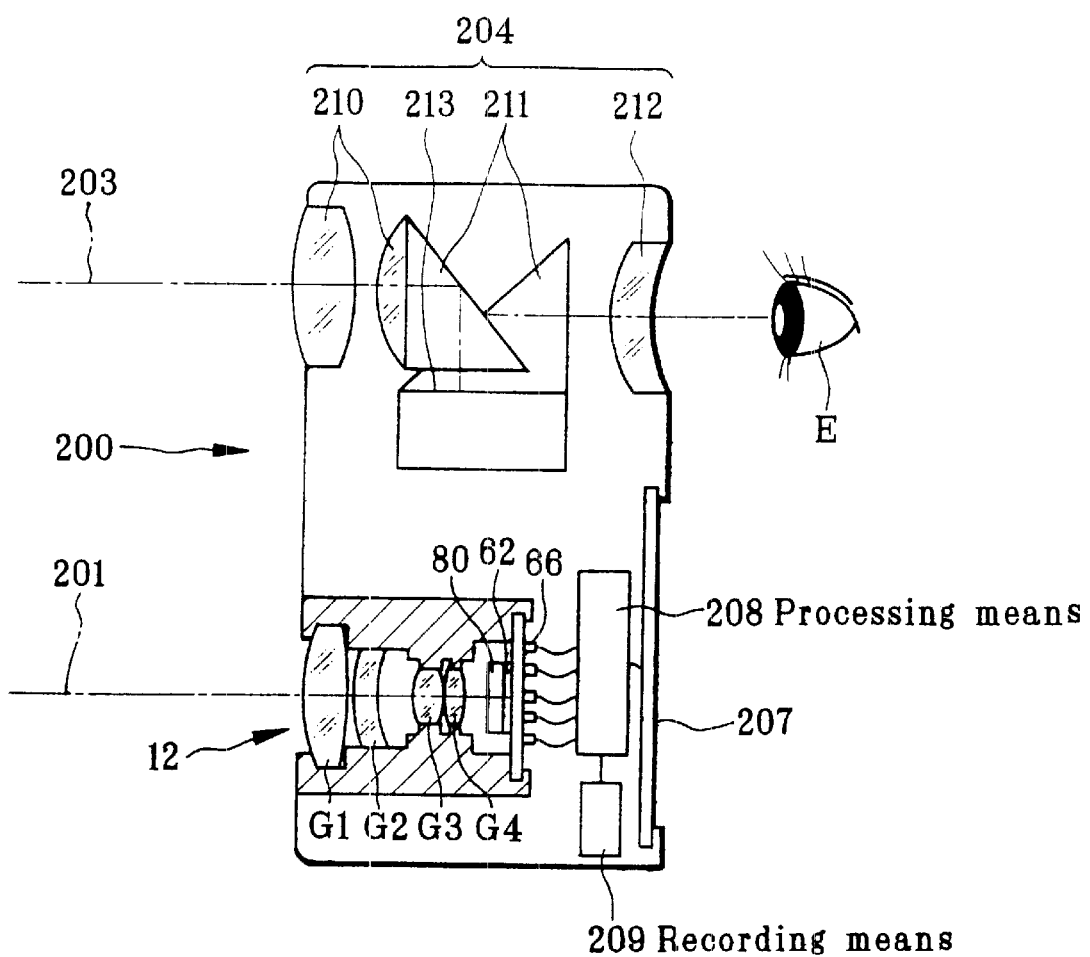
FIG. 16 is a sectional view illustrative of the electronic camera wherein the zoom lens system of the present invention is incorporated in the form of an objective optical system.

An electronic cameral wherein the zoom lens system of the present invention is incorporated in the form of an objective optical system is shown in FIGS. 14 to 16. FIG. 14 is a front perspective view illustrative of the appearance of an electronic camera 200, and FIG. 15 is a rear perspective view illustrative of the electronic camera 200. FIG. 16 is a sectional view illustrative of the construction of the electronic camera 200. As shown in FIGS. 14 to 16, the electronic camera 200 comprises a phototaking optical system 202 including a phototaking optical path 201, a finder optical system 204 including a finder optical path 203, a shutter 205, a flash 206 and a liquid crystal display monitor 207. Upon pressing down the shutter 205 located on the upper portion of the camera 200, phototaking occurs through an objective lens system 12 comprising the instant zoom lens system (roughly shown) located as a phototaking objective optical system. An object image formed through the phototaking optical system is then formed on the image pickup plane of an image pickup device chip 62 such as a CCD via an IR (infrared rays) cut filter 80.

The object image sensed by image pickup device chip 62 is displayed as an electronic image on the liquid crystal display monitor 207 located on the back side of the camera via processing means 208 electrically connected to a terminal 66. This processing means 208 may also control recording means 209 for recording the object image phototaken through the image pickup device chip 62 in the form of electronic information. It is here noted that the recording means 209 may be provided as a memory mounted on the processing means 208 or in the form of a device electrically connected to the processing means 208 to electronically write the information into a magnetic recording medium such as a floppy disk or smart media.

Further, the finder optical system 204 having a finder optical path 203 comprises a finder objective optical system 210, a Porro prism 211 for erecting the object image formed through the finder objective optical system 210 and an eyepiece 212 for guiding the object image to the eyeball E of an observer. The Porro prism 211 is divided into a front and a rear block with an object image-forming surface located between them. The Porro prism 211 comprises four reflecting surfaces to erect the object image formed through the finder objective optical system 204.

To reduce the number of parts and achieve compactness and cost reductions, the finder optical system 204 may be removed from the camera 200. In this case, the observer carries out phototaking while looking at the liquid crystal monitor 207.

Figure 17:
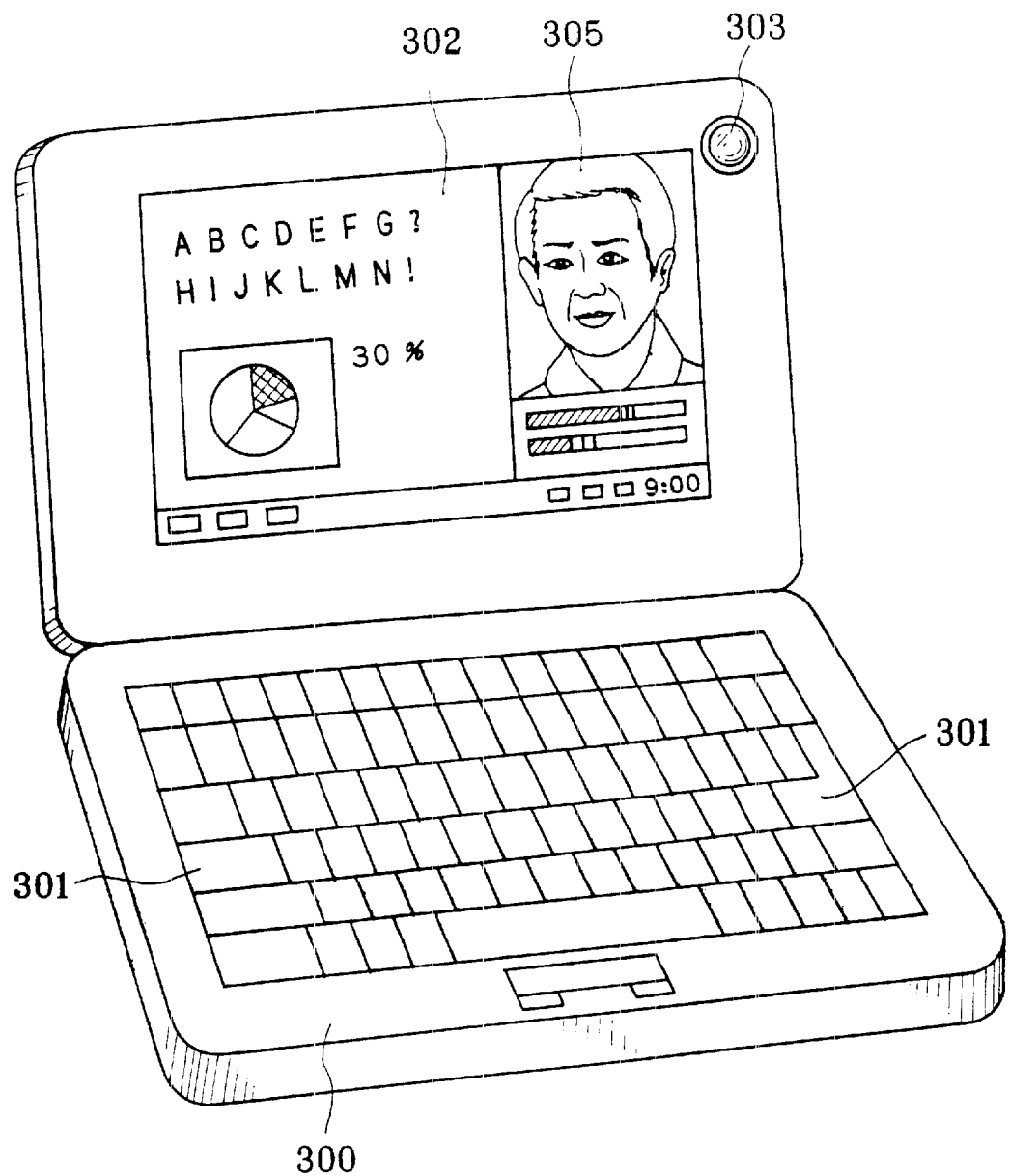
FIG. 17 is a front perspective view illustrative of an uncovered personal computer wherein the zoom lens system of the present invention is incorporated in the form of an objective optical system.
Figure 18:
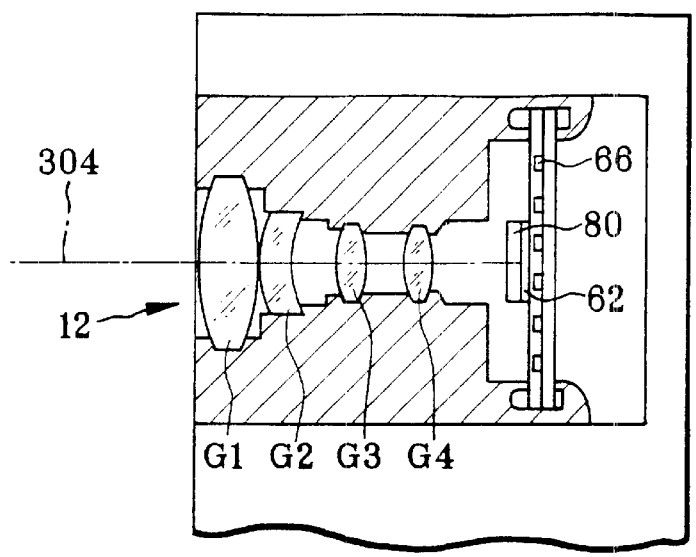
FIG. 18 is a sectional view of a phototaking optical system in the personal computer.
Figure 19:
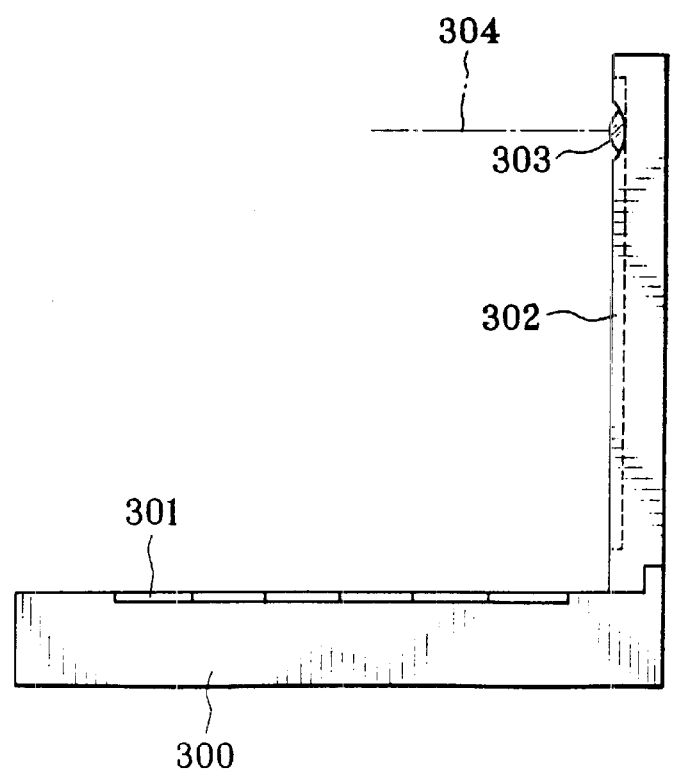
FIG. 19 is a side view of FIG. 17.

Shown in FIGS. 17 to 19 is a personal computer that is one example of the information processor in which the zoom lens system of the invention is incorporated in the form of an objective optical system. FIG. 17 is a front perspective views of an uncovered personal computer 300, FIG. 18 is a sectional view of a phototaking optical system 303 mounted on the personal computer 300, and FIG. 19 is a side view of FIG. 17. As depicted in FIGS. 17 to 19, the personal computer 300 comprises a key board 301 for allowing an operator to enter information therein from outside, information processing and recording means (not shown), a monitor 302 for displaying the information to the operator and a phototaking optical system 303 for phototaking an image of the operator per se and images of operator's surroundings. The monitor 302 used herein may be a transmission type liquid crystal display device designed to be illuminated by a backlight (not shown) from the back side, a reflection type liquid crystal display device designed to display images by reflecting light from the front side, a CRT display or the like. As shown, the phototaking optical system 303 is built in a right upper portion of monitor 302. However, it is to be understood that the phototaking optical system 303 may be positioned somewhere on the periphery of monitor 302 or keyboard 301.

The phototaking optical system 303 includes on a phototaking optical path 304 an objective lens system 12 comprising the zoom lens system of the invention (roughly shown) and an image pickup device chip 62 for receiving an image. These are built in the personal computer 300.

An object image sensed by the image pickup device chip 62 is entered from a terminal 66 in the processing means in the personal computer 300, and displayed as an electronic image on the monitor 302. Shown in FIG. 17 as an example is a phototaken image 305 of the operator. It is possible to display the image 305, etc. on a personal computer at the other end on a remote place via an internet or telephone line.

Figure 20A:
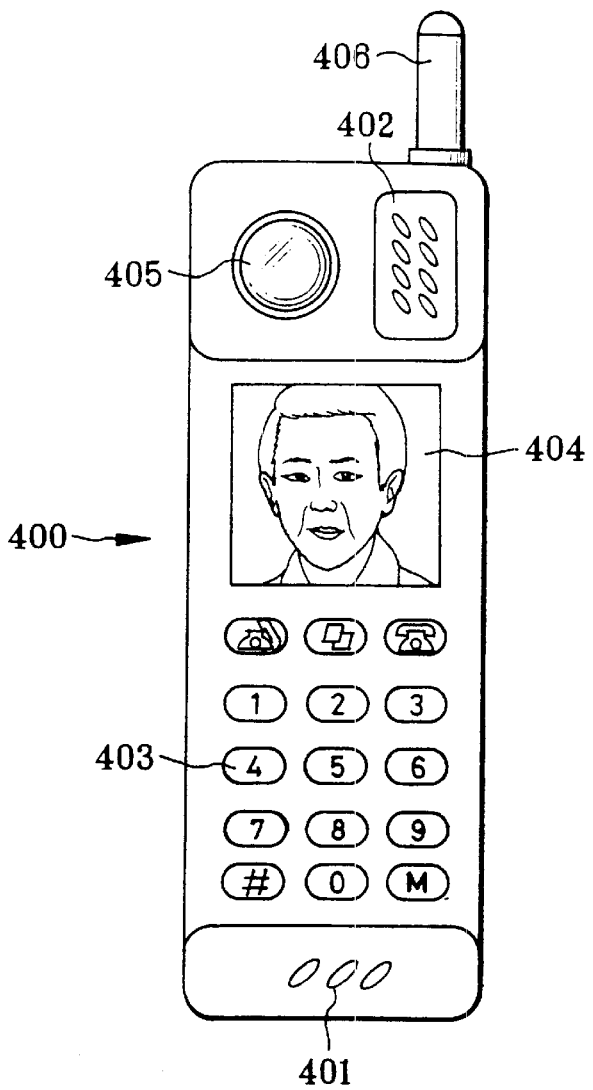
FIGS. 20(*a*) and 20(*b*) are a front and a side view illustrative of a portable telephone wherein the zoom lens system of the present invention is incorporated in the form of an objective optical system, and FIG. 20(*c*) is a sectional view of a phototaking optical system.
Figure 20B:
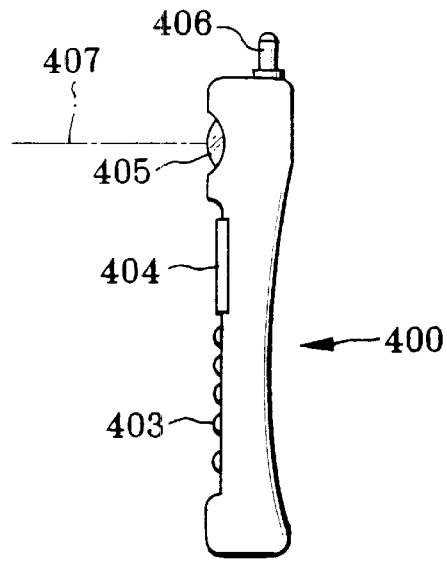
Figure 20C:
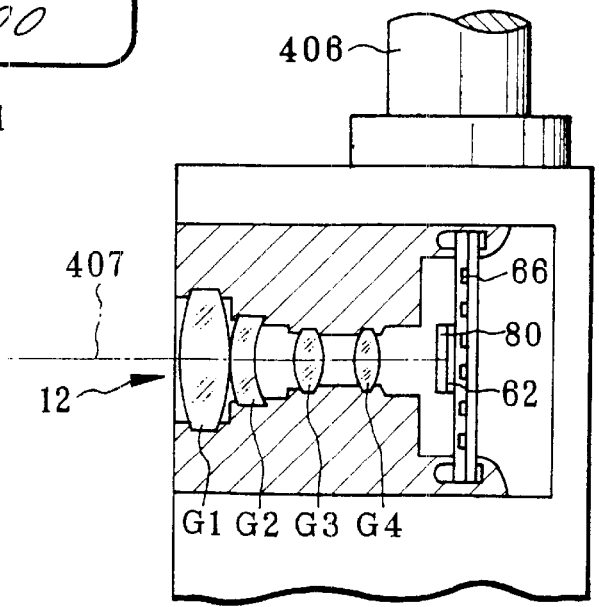

Illustrated in FIG. 20 is a telephone handset that is one example of the information processor in which the zoom lens system of the invention is built in the form of a phototaking optical system, especially a convenient-to-carry portable telephone handset. FIG. 20(a) is a front view of a portable telephone handset 400, FIG. 20(b) is a side view of handset 400 and FIG. 20(c) is a sectional view of a phototaking optical system 405. As depicted in FIGS. 20(a) to 20(c), the telephone handset 400 comprises a microphone portion 401 for entering an operator's voice therein as information, a speaker portion 402 for producing a voice of a person on the other end, an input dial 403 allowing the operator to enter information therein, a monitor 404 for displaying phototaken images of the operator and the person on the other end and information such as telephone numbers, a phototaking optical system 405, an antenna 406 for transmitting and receiving communication waves and a processing means (not shown) for processing image information, communication information, input signals, etc. The monitor 404 used herein is a liquid crystal display device. The arrangement of these parts is not necessarily limited to that illustrated. The phototaking optical system 405 includes on a phototaking optical path 407 an objective lens system 12 comprising the zoom lens system (roughly illustrated) of the invention and an image pickup device chip 62 for receiving an object image. These are built in the telephone handset 400.

The object image sensed by the image pickup device chip 62 is entered from a terminal 66 in a processing means (not shown), and displayed as an electronic image on the monitor 404 and/or a monitor on the other end. To transmit an image to a person on the other end, the processing means includes a signal processing function of converting information about the object image received at the image pickup element chip 62 to transmittable signals.

According to the present invention as explained above, it is thus possible to achieve a compact yet low-cost zoom lens system, and especially a zoom lens system suitable for use on portable information terminals of small size.

I claim:

1. An image pickup system including a finder optical system, a display monitor, and an objective optical system comprising a zoom lens system and an electronic image pickup device located on an image side of said zoom lens system, an object image sensed by said pickup device is displayed as an electronic image on said display monitor, wherein said zoom lens system comprises, in order from the object side of said zoom lens, a first lens group having positive refracting power, a second lens group having negative refracting power and designed to move from the object side to an image plane side of the zoom lens system for zooming from a wide-angle end to a telephoto end of said zoom lens system, a third lens group having positive refracting power and designed to move from the image plane side to the object side for zooming from the wide angle end to the telephoto end, and fourth lens group having positive refracting power and designed to be movable for zooming, wherein said first lens group consists of a positive lens component, wherein said second lens group consists of, in order from the object side, a negative lens element convex toward the object side, a bi-concave negative lens element, and a positive lens element convex toward the object side, wherein said third lens group consists of, in order from the object side, a positive single lens component convex to the object side, and a cemented lens component including a bi-convex lens element and a bi-concave lens element, and wherein said fourth lens group consists of a positive single lens component convex to the object side.

2. An image pickup system including an objective optical system comprising a zoom lens system and an electronic image pickup device located on an image side of said zoom lens system, wherein said zoom lens system comprising, in order from an object side of said zoom lens system, a first lens group having positive refracting power and designed to be fixed during zooming, a second lens group having negative refracting power and designed to move from the object side to an image plane side of said zoom lens system for zooming from a wide-angle end to a telephoto end of said zoom lens system, a third lens group having positive refracting power and designed to move from the image plane side to the object side for zooming from the wide-angle end to the telephoto end, and a fourth lens group having positive refracting power and designed to be movable for zooming wherein the following conditions are satisfied:

$$0.49 < |L3/L2| < 1 \quad (2)$$

$$2.5 \text{ mm} < fB(\min) < 4.8 \text{ mm} \quad (10)$$

where Li is an amount of movement of an i-th lens group from the wide-angle end to the telephoto end and fB(min) is a length, as calculated on an air basis, of a final surface of a lens having power in said zoom lens system to an image plane of said zoom lens system, representing a figure at which said zoom lens system becomes shortest in a whole zooming space.

3. An image pickup system including an objective optical system comprising a zoom lens system and an electronic image pickup device located on an image side of said zoom lens system, wherein said zoom lens system comprising, in order from an object side of said zoom lens system, a first lens group having positive refracting power and designed to be fixed during zooming, a second lens group having negative refracting power and designed to move from the object side to an image plane side of the zoom lens system for zooming from a wide-angle end to a telephoto end of said zoom lens system, a third lens group having positive refracting power and designed to move from the object side to the image plane side for zooming from the wide-angle end to the telephoto end, and a fourth lens group having positive refracting power and designed to be movable for zooming wherein the following conditions are satisfied:

$$2 < (F3.4W)/IH < 3.3 \tag{3}$$

$$2.5 \text{ mm} < fB(\min) < 4.8 \text{ mm} \tag{10}$$

where (F3.4W) is a composite focal length of the third and fourth lens groups at the wide angle end, IH is a radius of an image circle, and fB(min) is a length, as calculated on an air basis, of a final surface of a lens having power in said zoom lens system to an image plane of said zoom lens system, representing a figure at which said zoom lens system becomes shortest in a whole zooming space.

4. An image pickup system including an objective optical system comprising a zoom lens system and an electronic image pickup device located on an image side of said zoom lens system, wherein said zoom lens system comprising, in order from an object side of said zoom lens system, a first lens group having positive refracting power, a second lens group having negative refracting power and designed to move from the object side to an image plane side of said zoom lens system for zooming from a wide-angle end to a telephoto end of said zoom lens system, a third lens group having positive refracting power and a fourth lens group having positive refracting power and designed to be movable for zooming, wherein said third lens group comprises, in order from an object side thereof, a positive lens component convex on an object side thereof and a cemented lens consisting of a positive lens element convex on an object side thereof and a negative lens element concave on an image plane side thereof, and both the object-side positive lens component and the cemented lens in said third lens group are held in a lens barrel while the object-side convex surfaces thereof abut peripherally or at peripheral several spots against said lens barrel, and the following condition is satisfied:

$$2.5 \text{ mm} < fB(\min) < 4.8 \text{ mm} \tag{10}$$

where fB(min) is a length, as calculated on an air basis, of a final surface of a lens having power in said zoom lens system to an image plane of said zoom lens system, representing a figure at which said zoom lens system becomes shortest in a whole zooming space.

5. An image pickup system including an objective optical system comprising a zoom lens system and an electronic image pickup device located on an image side of said zoom lens system, wherein said zoom lens system comprising, in order from an object side of said zoom lens system, a first lens group having positive refracting power and designed to be fixed during zooming, a second lens group having negative refracting power and designed to move from the object side to an image plane side of the zoom lens system for zooming from a wide-angle end to a telephoto end of said zoom lens system, a third lens group having positive refracting power and designed to move from the image plane side to the object side for zooming from the wide-angle end to the telephoto end, and a fourth lens group having positive refracting power and designed to be movable for zooming, wherein the following conditions are satisfied:

$$0.5 < |F2/F3| < 1.2 \tag{1}$$

$$0.49 < |L3/L2| < 1 \tag{2}$$

$$2.5 \text{ mm} < fB(\min) < 4.8 \text{ mm} \tag{10}$$

where Fi is a focal length of an i-th lens group, Li is an amount of an i-th lens group from the wide-angle end to the telephoto end, and fB(min) is a length, as calculated on an air basis, of a final surface of a lens having power in said zoom lens system to an image plane of said zoom lens system, representing a figure at which said zoom lens system becomes shortest in a whole zooming space.

6. An image pickup system including an objective optical system comprising a zoom lens system and an electronic image pickup device located on an image side of said zoom lens system, wherein said zoom lens system comprising, in order from an object side of said zoom lens system, a first lens group having positive refracting power and designed to be fixed during zooming, a second lens group having negative refracting power and designed to move from the object side to an image plane side of the zoom lens system for zooming from a wide-angle end to a telephoto end of said zoom lens system, a third lens group having positive refracting power and designed to move from the image plane side to the object side for zooming from the wide-angle end to the telephoto end, and a fourth lens group having positive refracting power and designed to be movable for zooming, wherein the following conditions are satisfied:

$$0.5 < |F2/F3| < 1.2 \tag{1}$$

$$2 < (F3.4W)/IH < 3.3 \tag{3}$$

$$2.5 \text{ mm} < fB(\min) < 4.8 \text{ mm} \tag{10}$$

where Fi is a focal length of an i-th lens group, (F3.4W) is a composite focal length of the third and fourth lens groups at the wide-angle end, IH is a radius of an image circle, and fb(min) is a length, as calculated on an air basis, of a final surface of a lens having power in said zoom lens system to an image plane of said zoom lens system, representing a figure at which said zoom lens system becomes shortest in a whole zooming space.

7. An image pickup system including an objective optical system comprising a zoom lens system and an electronic image pickup device located on an image side of said zoom lens system,
   wherein said zoom lens system comprising, in order from an object side of said zoom lens system,
   a first lens group having positive refracting power and designed to be fixed during zooming,
   a second lens group having negative refracting power and designed to move from the object side to an image plane side of the zoom lens system for zooming from a wide-angle end to a telephoto end of said zoom lens system,
   a third lens group having positive refracting power and designed to move from the image plane side to the object side for zooming from the wide-angle end to the telephoto end, and
   a fourth lens group having positive refracting power and designed to be movable for zooming wherein the following conditions are satisfied:

$$0.49 < |L3/L2| < 1 \quad (2)$$

$$2 < (F3.4W)/IH < 3.3 \quad (3)$$

$$2.5 \text{ mm} < fB(\min) < 4.8 \text{ mm} \quad (10)$$

where Li is an amount of movement of an i-th lens group, (F3.4w) is a composite focal length of the third and fourth lens groups at the wide-angle end, IH is a radius of an image circle, and fB(min) is a length, as calculated on an air basis, of a final surface of a lens having power in said zoom lens system to an image plane of said zoom lens system, representing a figure at which said zoom lens system becomes shortest in a whole zooming space.

8. An image pickup system including an objective optical system comprising a zoom lens system and an electronic image pickup device located on an image side of said zoom lens system,
   wherein said zoom lens system comprising, in order from an object side of said zoom lens system,
   a first lens group having positive refracting power and designed to be fixed during zooming,
   a second lens group having negative refracting power and designed to move from the object side to an image plane side of the zoom lens system for zooming from a wide-angle end to a telephoto end of said zoom lens system,
   a third lens group having positive refracting power and designed to move from the image plane side to the object side for zooming from the wide-angle end to the telephoto end, and
   a fourth lens group having positive refracting power and designed to be movable for zooming, wherein the following conditions are satisfied:

$$0.5 < |F2/F3| < 1.2 \quad (1)$$

$$0.49 < |L3/L2| < 1 \quad (2)$$

$$2 < (F3.4W)/IH < 3.3 \quad (3)$$

$$2.5 \text{ mm} < fB(\min) < 4.8 \text{ mm} \quad (10)$$

where Fi is a focal length of an i-th lens group, Li is an amount of movement of an i-th lens group, (F3.4W) is a composite focal length of the third and fourth lens groups at the wide-angle end, IH is a radius of an image circle, and fB(min) is a length, as calculated on an air basis, of a final surface of a lens having power in said zoom lens system to an image plane of said zoom lens system, representing a figure at which said zoom lens system becomes shortest in a whole zooming space.

9. The image pickup system according to any one of claims 1, 2, 3 and 5 to 8, wherein said zoom lens system satisfies the following condition:

$$0.6 < |F2/F3| < 1 \quad (4)$$

where Fi is the focal length of an i-th lens group.

10. The image pickup system according to any one of claims 1, 2, 3, and 5 to 8, wherein said fourth lens group is moved in an optical axis direction for focusing.

11. The image pickup system according to any one of claims 1, 2, 3, and 5 to 8, wherein said zoom lens system satisfies the following condition:

$$0.3 < |F3/F4| < 0.8 \quad (5)$$

where Fi is the focal length of an i-th lens group.

12. The image pickup system according to any one of claims 1, 2, 3, and 5 to 8, wherein said zoom lens system satisfies the following condition:

$$0.4 < |\beta 2T| < 1 \quad (6)$$

where $\beta 2T$ is a transverse magnification of the second lens group.

13. The image pickup system according to any one of claims 1, 2, 3, and 5 to 8, wherein said fourth lens group consists of one positive lens element.

14. The image pickup system according to any one of claims 1, 2, 3, and 5 to 8, wherein said third lens group consists of three lenses elements or a positive lens element, a positive lens element and a negative lens element in order from an object side thereof.

15. The image pickup system according to any one of claims 1, 2, 3, and 5 to 8, wherein at least one surface in said third lens group is defined by an aspherical surface.

16. The image pickup system according to any one of claims 1, 2, 3, and 5 to 8, wherein at least one surface in said fourth lens group is defined by an aspherical surface.

17. The image pickup system according to any one of claims 1, 2, 3, and 5 to 8, wherein at least one surface in said second lens group is defined by an aspherical surface.

18. An image pickup system including an objective optical system comprising a zoom lens system and an electronic image pickup device located on an image side of said zoom lens system,
   wherein said zoom lens system comprising, in order from an object side of said zoom lens system,
   a first lens group having positive refracting power and designed to be fixed during zooming,
   a second lens group having negative refracting power and designed to move from the object side to an image plane side of the zoom lens system for zooming from a wide-angle end to a telephoto end of said zoom lens system,
   a third lens group having positive refracting power and designed to move from the image plane side to the object side for zooming from the wide-angle end to the telephoto end, and
   a fourth lens group having positive refracting power and designed to be movable for zooming, wherein said first lens group consists of one positive lens element, a lens element located nearest to the object side in said second lens group is defined by a negative lens element, and the following conditions are satisfied:

$$v21 < 40 \quad (7)$$

$$2.5 \text{ mm} < fB(\text{min}) < 4.8 \text{ mm} \quad (10)$$

where v21 is an Abbe's number of said negative lens element located nearest to the object side in said second lens group, and fB(min) is a length, as calculated on an air basis, of a final surface of a lens having power in said zoom lens system to an image plane of said zoom lens system, representing a figure at which said zoom lens system becomes shortest in a whole zooming space.

19. The image pickup system according to claim 18, which satisfies the following condition:

$$v21 < 35 \quad (8)$$

20. The image pickup system according to any one of claims 1, 2, 3, and 5 to 8, wherein a lens element located nearest to the object side in said second lens group is defined by a negative lens element, and the following condition is satisfied:

$$v21 < 40 \quad (7)$$

where $v_{21}$ is an Abbe's number of said negative lens element located nearest to the object side in said lens group.

21. The image pickup system according to claim 20, which satisfies the following condition:

$$v21 < 35 \quad (8)$$

where v21 is an Abbe's number of said negative lens element located nearest to the object side in said second lens group.

22. The image pickup system according to any one of claims 1, 2, 5 to 8, 18 and 19, wherein said third lens group comprises, in order from an object side thereof, a positive lens component convex on an object side thereof and a cemented lens consisting of a positive lens element convex on an object side thereof and a negative lens element concave on an image side thereof, and said cemented lens and said positive lens on the object side are held in a lens barrel while the peripheral edges of the convex surfaces thereof abut peripherally or at a peripheral several spots against the lens barrel.

23. An image pickup system including an objective optical system comprising a zoom lens system and an electronic image pickup device located on an image side of said zoom lens system, wherein said zoom lens system comprising, in order from an object side of said zoom lens system, a first lens group having positive refracting power and designed to be fixed during zooming, a second lens group having negative refracting power and designed to move from the object side to an image plane side of the zoom lens system for zooming from a wide-angle end to a telephoto end of said zoom lens system, a third lens group having positive refracting power and designed to move constantly from the image plane side to the object side for zooming from the wide-angle end to the telephoto end, and a fourth lens group having positive refracting power and designed to be movable during zooming, wherein said third lens group comprises a cemented lens consisting of a positive lens element and a negative lens element, said fourth lens group consists of one positive lens element, and the following conditions are satisfied:

$$2.5 \text{ mm} < fB(\text{min}) < 4.8 \text{ mm} \quad (10)$$

where fB(min) is a length, as calculated on an air basis, of a final surface of a lens having power in said zoom lens system to an image plane of said zoom lens system, representing a figure at which said zoom lens system becomes shortest in a whole zooming space.

24. The image pickup system according to claim 23, wherein at least one surface of said positive lens in said fourth lens group is defined by an aspherical surface.

25. An image pickup system including an objective optical system comprising a zoom lens system and an electronic image pickup device located on an image side of said zoom lens system, wherein said zoom lens system comprising, in order from an object side of said zoom lens system, a first lens group having positive refracting power and designed to be fixed during zooming, a second lens group having negative refracting power and designed to move from the object side to an image plane side of the zoom lens system for zooming from a wide-angle end to a telephoto end of said zoom lens system, a third lens group having positive refracting power and designed to move constantly from the image plane side to the object side for zooming from the wide-angle end to the telephoto end, and a fourth lens group having positive refracting power and designed to be movable during zooming, wherein said second lens group, and said third lens group comprises a cemented lens consisting of a positive lens element and a negative lens element, and the following condition (10) is satisfied:

$$2.5 \text{ mm} < fB(\text{min}) < 4.8 \text{ mm} \quad (10)$$

where fB(min) is a length, as calculated on an air basis, of a final surface of a lens having power in said zoom lens system to an image plane of said zoom lens system, representing a figure at which said zoom lens system becomes shortest in a whole zooming space.

26. An image pickup system including an objective optical system comprising a zoom lens system and an electronic image pickup device located on an image side of said zoom lens system, wherein said zoom lens system comprising, in order from an object side of said zoom lens system, a first lens group having positive refracting power and designed to be fixed during zooming, a second lens group having negative refracting power and designed to move from the object side to an image plane side of the zoom lens system for zooming from a wide-angle end to a telephoto end of said zoom lens system, a third lens group having positive refracting power and designed to move constantly from the image plane side to the object side for zooming from the wide-angle end to the telephoto end, and a fourth lens group having positive refracting power and designed to be movable during zooming, wherein said third lens group comprises, in order from an object side thereof, a positive lens component and a cemented lens consisting of a positive lens element and a negative lens element, and the following condition (10) is satisfied:

$$2.5 \text{ mm} < fB(\min) < 4.8 \text{ mm} \tag{10}$$

where fB(min) is a length, as calculated on an air basis, of a final surface of a lens having power in said zoom lens system to an image plane of said zoom lens system, representing a figure at which said zoom lens system becomes shortest in a whole zooming space.

27. An image pickup system including an objective optical system comprising a zoom lens system and an electronic image pickup device located on an image side of said zoom lens system,
  wherein said zoom lens system comprising, in order from an object side of said zoom lens system,
  a first lens group having positive refracting power,
  a second lens group having negative refracting power,
  a third lens group having positive refracting power, and
  a fourth lens group having positive refracting power,
  wherein a spacing between said first lens group and said second lens group, a spacing between said second lens group and said third lens group, and a spacing between said third lens group and said fourth lens group varies upon zooming,
  said third lens group comprises, in order from an object side thereof, a double-convex positive lens component and a cemented lens consisting of a positive meniscus lens element convex on an object side thereof and a negative meniscus lens element, said fourth lens group comprises a double-convex lens element in which an object-side surface thereof has a larger curvature, and the following condition (10) is satisfied:

$$2.5 \text{ mm} < fB(\min) < 4.8 \text{ mm} \tag{10}$$

where fB(min) is a length, as calculated on an air basis, of a final surface of a lens having power in said zoom lens system to an image plane of said zoom lens system, representing a figure at which said zoom lens system becomes shortest in a whole zooming space.

28. An image pickup system including an objective optical system comprising a zoom lens system and an electronic image pickup device located on an image side of said zoom lens system,
  wherein said zoom lens system comprising, in order from an object side of said zoom lens system,
  a first lens group having positive refracting power,
  a second lens group having negative refracting power,
  a third lens group having positive refracting power, and
  a fourth lens group having positive refracting power,
  wherein a spacing between said first lens group and said second lens group, a spacing between said second lens group and said third lens group, and a spacing between said third lens group and said fourth lens group varies upon zooming,
  said first lens group consists of one positive lens component, said second lens group comprises three lens elements or one single lens element and a cemented lens consisting of a negative lens element and a positive lens element in order from an object side thereof, said third lens group comprises three lens elements or a single lens element and a cemented lens consisting of a positive lens element and a negative lens element in order from an object side thereof, said fourth lens group consists of one positive lens element, and the following condition (10) is satisfied:

$$2.5 \text{ mm} < fB(\min) < 4.8 \text{ mm} \tag{10}$$

where fB(min) is a length, as calculated on an air basis, of a final surface of a lens having power in said zoom lens system to an image plane of said zoom lens system, representing a figure at which said zoom lens system becomes shortest in a whole zooming space.

29. An image pickup system including an objective optical system comprising a zoom lens system and an electronic image pickup device located on an image side of said zoom lens system,
  wherein said zoom lens system comprising, in order from an object side of said zoom lens system,
  a first lens group having positive refracting power,
  a second lens group having negative refracting power,
  a third lens group having positive refracting power, and
  a fourth lens group having positive refracting power,
  wherein a spacing between said first lens group and said second lens group, a spacing between said second lens group and said third lens group, and a spacing between said third lens group and said fourth lens group varies upon zooming,
  said first lens group comprises two lens elements or a positive lens element and a negative lens element, said second or said third lens group includes therein a cemented lens component consisting of at least one set of a positive lens element and a negative lens element, and the following condition (10) is satisfied:

$$2.5 \text{ mm} < fB(\min) < 4.8 \text{ mm} \tag{10}$$

where fB(min) is a length, as calculated on an air basis, of a final surface of a lens having power in said zoom lens system to an image plane of said zoom lens system, representing a figure at which said zoom lens system becomes shortest in a whole zooming space.

30. An image pickup system including an objective optical system comprising a zoom lens system and an electronic image pickup device located on an image side of said zoom lens system,
  wherein said zoom lens system comprising, in order from an object side of said zoom lens system,
  a first lens group having positive refracting power and designed to be fixed during zooming,
  a second lens group having negative refracting power and designed to move from the object side to an image plane side of the zoom lens system for zooming from a wide-angle end to a telephoto end of said zoom lens system,
  a third lens group having positive refracting power and designed to move constantly from the image plane side to the object side for zooming from the wide-angle end to the telephoto end, and
  a fourth lens group consists of one lens element, having positive refracting power and designed to be movable during zooming, wherein said second lens group, and said third lens group comprises a cemented lens component consisting of a positive lens element and a negative lens element,
  and image side surface of said cemented lens component in said second lens group is concave surface,
  and said third lens group or said fourth lens group includes therein at least one aspherical surface.

31. An image pickup system including an objective optical system comprising a zoom lens system and an electronic image pickup device located on an image side of said zoom lens system, wherein said zoom lens system comprising, in order from an object side of said zoom lens system, a first lens group having positive refracting power, a second lens group having negative refracting power, a third lens group having positive refracting power, and a fourth lens group having positive refracting power, wherein a spacing between said first lens group and said second lens group, a spacing between said second lens group and said third lens group, and a spacing between said third lens group and said fourth lens group varies upon zooming, said first lens group consists of one positive lens component, said second lens group comprises three lens elements or a single lens element and a cemented lens consisting of a negative lens element and a positive lens element in order from an object side thereof, said third lens group comprises three lens elements or a single lens element and a cemented lens consisting of a positive lens element and a negative lens, and said fourth lens group consists of one positive lens element, with at least one aspherical surface introduced in said third lens group or said fourth lens group, and an image side surface of said cemented lens in said second lens group is concave surface.

32. The image pickup system according to any one of claims 1 to 8, 21, 23 and 25 to 31, wherein said zoom lens system satisfies the following condition:

$$2.5 \text{ mm} < fB(\text{max}) < 4.8 \text{ mm} \tag{11}$$

where fB(max) is a length, as calculated on an air basis, of a final surface of a lens having power in said zoom lens system to an image plane of said zoom lens system, representing a figure at which said zoom lens system becomes longest in a whole zooming space.

33. An image pickup system including a finder optical system, a display monitor, and an objective optical system comprising a zoom lens system and an electronic image pickup device located on an image side of said zoom lens system, and an object image sensed by said image pickup device is displayed as an electronic image on said display monitor, wherein said zoom lens system comprising, in order from the object side of said zoom lens, a first lens group having positive refracting power, a second lens group having negative refracting power and designed to move from the object side to an image plane side of the zoom lens system for zooming from a wide-angle end to a telephoto end of said zoom lens system, a third lens group having positive refracting power and designed to move from the image plane side to the object side for zooming from the wide-angle end to the telephoto end, and a fourth lens group having positive refracting power and designed to be movable for zooming, wherein said first lens group consists of a positive lens component, wherein said second lens group consists of, in order from the object side, a negative lens element convex toward the object side, a bi-concave negative lens element, and a positive lens element convex toward the object side wherein said third lens group consists of, in order from the object side, a bi-convex single lens component, a cemented lens component including a bi-convex lens element and a bi-concave lens element, and wherein said fourth lens group consists of a positive single lens component convex to the object side.

34. The image pickup system according to claim 33, wherein the following condition is satisfied:

$$0.5 < |F2/F3| < 1.2 \tag{1}$$

35. The image pickup system according to claim 33, wherein the following condition is satisfied:

$$0.49 < |L3/L2| < 1 \tag{2}$$

36. The image pickup system according to claim 33, wherein the following condition is satisfied:

$$2 < (F3.4W)/IH < 3.3 \text{ mm} \tag{3}$$

37. The image pickup system according to claim 33, wherein the following condition is satisfied:

$$0.6 < |F2/F3| < 1 \tag{4}$$

38. The image pickup system according to claim 33, wherein the following condition is satisfied:

$$0.3 < |F3/F4| < 0.8 \tag{5}$$

39. The image pickup system according to claim 33, wherein the following condition is satisfied:

$$0.4 < |\beta 2T| < 1 \tag{6}$$

40. The image pickup system according to claim 33, wherein the following condition is satisfied:

$$v21 < 40 \tag{7}$$

41. The image pickup system according to claim 33, wherein the following condition is satisfied:

$$v21 < 35 \tag{8}$$

* * * * *